United States Patent
Zhao et al.

(10) Patent No.: US 10,951,293 B2
(45) Date of Patent: Mar. 16, 2021

(54) WIRELESS COMMUNICATION METHOD AND WIRELESS COMMUNICATION APPARATUS

(71) Applicant: Sony Corporation, Tokyo (JP)

(72) Inventors: Peiyao Zhao, Beijing (CN); Zhaocheng Wang, Beijing (CN); Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/470,986

(22) PCT Filed: Mar. 15, 2018

(86) PCT No.: PCT/CN2018/079102
§ 371 (c)(1),
(2) Date: Jun. 19, 2019

(87) PCT Pub. No.: WO2018/184455
PCT Pub. Date: Oct. 11, 2018

(65) Prior Publication Data
US 2019/0393948 A1 Dec. 26, 2019

(30) Foreign Application Priority Data
Apr. 6, 2017 (CN) .......................... 201710218868.2

(51) Int. Cl.
*H04B 7/06* (2006.01)
*H04B 7/0417* (2017.01)
*H04B 7/0452* (2017.01)

(52) U.S. Cl.
CPC ......... *H04B 7/0682* (2013.01); *H04B 7/0417* (2013.01); *H04B 7/0452* (2013.01); *H04B 7/0617* (2013.01)

(58) Field of Classification Search
CPC .. H04B 7/0408; H04B 7/0413; H04B 7/0417; H04B 7/0452; H04B 7/0617; H04B 7/0619; H04B 7/0682
See application file for complete search history.

(56) References Cited

U.S. PATENT DOCUMENTS

| 5,592,179 | A | * | 1/1997 | Windyka | ................. | H01Q 3/22 342/157 |
| 6,025,803 | A | * | 2/2000 | Bergen | .................. | H01Q 1/246 343/700 MS |

(Continued)

FOREIGN PATENT DOCUMENTS

| CN | 103840261 A | 6/2014 |
| CN | 105940616 A | 9/2016 |
| CN | 106252901 A | 12/2016 |

OTHER PUBLICATIONS

International Search Report and Written Opinion dated May 30, 2018 for PCT/CN2018/079102 filed on Mar. 15, 2018, 9 pages including English Translation of the International Search Report.

(Continued)

*Primary Examiner* — David B Lugo
(74) *Attorney, Agent, or Firm* — Xsensus LLP

(57) ABSTRACT

The present invention discloses wireless communication method and wireless communication apparatus. Provided is an electronic equipment for a first communication apparatus of a wireless communication system, comprising: a number of antenna sub-arrays, each sub-array comprising a plurality of antennas, each column or row in the sub-array corresponding to one input terminal; a plurality of groups of first direction phase shifter, wherein the first direction phase shifters in each group are disposed between the input terminal of the corresponding sub array and a radio frequency chain, wherein each group of the plurality of groups of first direction phase shifters is configured to adjust a first (Continued)

direction angle of an antenna wave beam for transmitting a corresponding radio frequency chain signal in a first direction in accordance with a first control signal.

5 Claims, 15 Drawing Sheets

(56) References Cited

U.S. PATENT DOCUMENTS

| | | |
|---|---|---|
| 2016/0020526 A1 | 1/2016 | Evtyushkin et al. |
| 2016/0054439 A1* | 2/2016 | Brookner ............... H01Q 13/20 |
| | | 342/26 R |
| 2018/0026689 A1* | 1/2018 | Khan ....................... H04B 7/10 |
| | | 375/295 |

OTHER PUBLICATIONS

Qualcomm Incorporated, "Initial calibration of channel models for elevation beamforming and FD-MIMO", 3GPP TSG-RAN WG1 No. 73 R1-132497, May 20-24, 2013, Fukuoka, Japan, pp. 1-7.

* cited by examiner

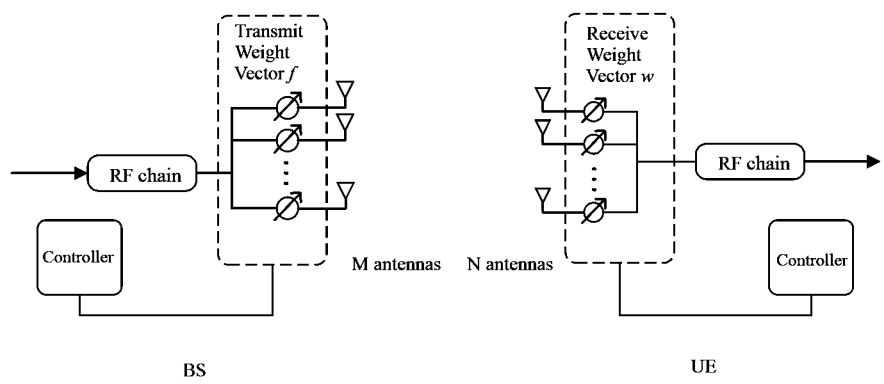
Fig.4a   Fig.4b
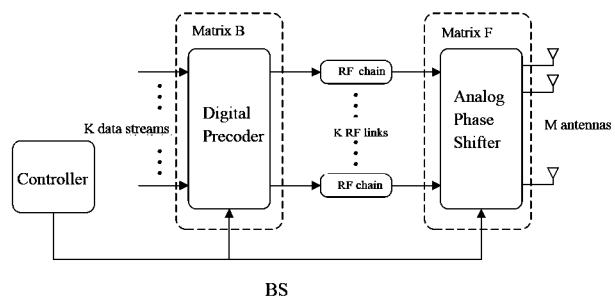
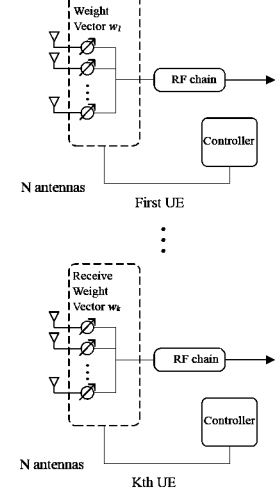
Fig.5a   Fig.5b

WIRELESS COMMUNICATION METHOD AND WIRELESS COMMUNICATION APPARATUS

CROSS-REFERENCE TO RELATED APPLICATIONS

The present application is based on PCT filing PCT/CN2018/079102, filed Mar. 15, 2018 which claims priority to CN 201710218868.2, filed Apr. 6, 2017, the entire contents of each are incorporated herein by reference.

FIELD OF THE INVENTION

The present disclosure relates to a wireless communication method and a wireless communication apparatus, and more particularly to a wireless communication method and a wireless communication apparatus for a massive multiple input multiple output communication system.

BACKGROUND

Recently, Massive Multi-Input Multi-Output (MIMO) technique and Millimeter Wave technique have been considered as a part of critical 5G technology in the future, and have attracted wide attentions from the academia and industry. The Millimeter Wave band has a large amount of available spectrum resources to meet growing traffic demands of mobile communications. In addition, due to short wavelength of the millimeter wave, according to the related antenna theory, sizes of antennas for a millimeter wave system are small, so that hundreds or even thousands of antennas can be arranged in a small space, which is more advantageous for usage of a large-scale antenna technology in a real system. In addition, a beamforming technology provided by large-scale antennas can effectively compensate for shortcoming of millimeter-wave channel paths attenuating excessively, which makes it possible to apply the millimeter-wave technology to mobile communications.

Full Dimension Multiple Output Multiple Output (Full Dimension MIMO, FD-MIMO) antenna technology, also be referred to as Uniform Planar Array antenna technology, is also one of hot spots attracting attentions from the industry. Compared with traditional linear antenna arrays, FD-MIMO can deploy more antennas in a limited space, thereby improving performances of spatial diversity and multiplexing. In the existing 3GPP standardization work, a two-dimensional planar antenna array (or be referred as full-dimensional MIMO, FD-MIMO) has become one of core technologies of a future 5G standard. In a Massive MIMO scenario, especially in a FD-MIMO scenario, how to reduce hardware complexity while ensuring antenna transmission performance has become a research focus of the industry.

DISCLOSURE OF THE INVENTION

The inventors of the present disclosure have found that when a first communication apparatus (e.g., a transmitter end, such as a base station end) in a wireless communication system is equipped with large-scale antennas, especially two-dimensional planar array antennas, an existing phase-shifting network architecture used for beamforming is difficult to ensure optimization of both antenna transmission performance and hardware complexity. Further, when there are multiple user equipments (second communication apparatuses, for example, receivers), there are often a plurality of radio frequency chains, the phase-shifting network architecture between the plurality of radio frequency chains and two-dimensional planar array antennas will be more complicated.

Accordingly, it is an object of the present disclosure to provide an improved technique for beamforming, particularly a solution for a millimeter wave communication system equipped with planar array antennas.

In view of this, the present application proposes an improved beamforming architecture, whose basic idea is for the planar array antenna used by each radio frequency chain, to design a two-layer phase shifting network for performing phase modulation and control for each layer respectively. In one implementation, the phase shifting network is split into a horizontal phase-shifting layer and a vertical phase-shifting layer. The configuration of a two-layer phase-shifting network enables independent selection of the precision of phase shifters in each layer for phase modulation and control.

The present application also proposes an improved beamforming architecture, whose basic idea is that planar array antennas may comprise a plurality of sub-arrays, each user or radio frequency chain finally performs communication using a beamforming result obtained by combining at least one of the plurality of sub-arrays. In one implementation, the planar array antennas include a plurality of sub-arrays, and for each radio frequency chain, a first beamforming training is performed by a corresponding sub-array, and a second beamforming training is performed by at least one sub-array of the plurality of sub-arrays other than the corresponding sub-array, so that final configuration parameters for data communication are obtained from configuration parameters separately obtained by the first and second beamforming trainings.

The present application also proposes an improved beamforming architecture, whose basic idea is that planar array antennas may comprise a plurality of sub-arrays, each of which is connected to at least one antenna sub-array via a two-layer phase-shifting network, thereby using a beamforming result combined by at least one of a number of sub-arrays for communication. For each subarray, a number of radio frequency chains are connected to the same vertical or horizontal phase shifter.

According to an aspect of the present disclosure, there is provided an electronic equipment for a first communication apparatus of a wireless communication system, comprising: a number of antenna sub-arrays, each sub-array being a planar antenna array, each column or row in the sub-array corresponding to one input terminal; a plurality of sets of first direction phase shifters, wherein the first direction phase shifters in each set are disposed between input terminals of the corresponding sub-arrays and a radio frequency chain, wherein each set of the plurality of sets of first direction phase shifters is configured to adjust a first direction angle of an antenna beam for transmitting a corresponding radio frequency chain signal in a first direction in accordance with a first control signal.

According to another aspect of the present disclosure, there is provided a method for a first communication apparatus of a wireless communication system, the first communication apparatus comprising: a number of antenna sub-arrays, each sub-array being a planar antenna array, each column or row in the sub-array corresponding to one input terminal; a plurality of sets of first direction phase shifters, wherein the first direction phase shifters in each set are disposed between input terminals of the corresponding sub-arrays and a radio frequency chain, the method comprises adjusting a first direction angle of an antenna beam for transmitting a corresponding radio frequency chain signal in a first direction in accordance with a first control signal.

According to another aspect of the present disclosure, there is provided a method for a first communication apparatus of a wireless communication system, wherein the first communication apparatus is equipped with a number of antenna sub-arrays and a number of radio frequency chains, the method includes for each of at least one radio frequency chain of the number of radio frequency chains, performing a first communication with a second communication apparatus in the wireless communication system via a first one of the number of antenna sub-arrays corresponding to the radio frequency chain, so that a first communication configuration parameter is determined; and performing a second communication with the second communication apparatus via at least one of remaining sub-arrays of the number of sub-arrays other than the corresponding first sub-array, so that a second communication configuration parameter is determined, wherein a communication configuration parameter for the radio frequency chain is determined based on the first communication configuration parameter and the second communication configuration parameter.

According to another aspect of the present disclosure, there is provided an electronic equipment for a first communication apparatus of a wireless communication system, wherein the first communication apparatus includes a number of antenna sub-arrays and a number of radio frequency chains, the electronic equipment includes a processing circuitry configured to: for each of at least one radio frequency chain of the number of radio frequency chains, perform a first communication with a second communication apparatus in the wireless communication system via a first one of the number of antenna sub-arrays corresponding to the radio frequency chain, so that a first communication configuration parameter is determined; and perform a second communication with the second communication apparatus via at least one of remaining sub-arrays of the number of sub-arrays other than the corresponding first sub-array, so that a second communication configuration parameter is determined, wherein a communication configuration parameter for the radio frequency chain is determined based on the first communication configuration parameter and the second communication configuration parameter.

According to another aspect of the present disclosure, there is provided an electronic equipment for a second communication apparatus of a wireless communication system, the electronic equipment includes a processing circuitry configured to: for a corresponding radio frequency chain of a first communication apparatus in the wireless communication system, acquire a channel state information in a first communication performed by the first communication apparatus with respect to the second communication apparatus via a first one of a plurality of antenna sub-arrays of the first communication apparatus corresponding to the radio frequency chain, so that a first communication configuration parameter is determined is based on the channel state information, and acquire a channel state information in a second communication performed by the first communication apparatus with respect to the second communication apparatus via at least one of remaining antenna sub-arrays of the plurality of antenna sub-arrays of the first communication apparatus other than the corresponding first antenna sub-array, so that a second communication configuration parameter is determined is based on the channel state information, wherein a communication configuration parameter for the radio frequency chain is determined based on the first communication configuration parameter and the second communication configuration parameter According to another aspect of the present disclosure, there is provided a method for a second communication apparatus of a wireless communication system, comprising: for a corresponding radio frequency chain of a first communication apparatus in the wireless communication system, acquiring a channel state information in a first communication performed by the first communication apparatus with respect to the second communication apparatus via a first one of a plurality of antenna sub-arrays of the first communication apparatus corresponding to the radio frequency chain, so that a first communication configuration parameter is determined is based on the channel state information; and acquiring a channel state information in a second communication performed by the first communication apparatus with respect to the second communication apparatus via at least one of remaining antenna sub-arrays of the plurality of antenna sub-arrays of the first communication apparatus other than the corresponding first antenna sub-array, so that a second communication configuration parameter is determined is based on the channel state information, wherein a communication configuration parameter for the radio frequency chain is determined based on the first communication configuration parameter and the second communication configuration parameter.

According to another aspect of the present disclosure, there is provided an electronic equipment for a first communication apparatus of a wireless communication system, comprising: a number of antenna sub-arrays, each sub-array comprising a plurality of antennas, each antenna being connected to at least one phase shifter; and a plurality of additional phase shifters, each additional phase shifter being disposed between one sub-array and one radio frequency chain, such that one radio frequency chain is connected to a plurality of antenna sub-arrays through a plurality of additional phase shifters, respectively.

According to an embodiment of the present disclosure, antenna sub-arrays for the first communication apparatus are capable of implementing RF-chain specific horizontal or vertical beam adjustment.

According to an embodiment of the present disclosure, a radio frequency chain is capable of utilizing spatial diversities of at least some of all sub-arrays in wireless communication to increase a beamforming gain.

According to an embodiment of the present application, hardware complexity can also be significantly reduced with less performance penalty.

Other features and advantages of the present invention will become apparent from the following detailed description of exemplary embodiments of the present disclosure with reference to the accompanying drawings.

DESCRIPTION OF THE DRAWINGS

The accompanying drawings, which are incorporated in and constitute a part of this specification, illustrate embodiments of the present disclosure and, together with the description, serve to explain the principles of the present disclosure.

The present disclosure will be more clearly understood from the following detailed description with reference to the accompanying drawings, in which:

FIGS. 4a and 4b are diagrams showing configurations of a base station and a user equipment in a single-user system, respectively.

FIGS. 5a and 5b are diagrams showing configurations of a base station and a user equipment in an analog-digital hybrid precoding architecture, respectively.

FIG. 9b shows a schematic diagram of a phase-shifting network for each antenna sub-array in the exemplary base station shown in FIG. 9a.

FIG. 9c shows a schematic diagram of another configuration of a phase shifting network for each antenna sub-array in the example base station shown in FIG. 9a.

FIG. 14 illustrates an exemplary hybrid connection architecture for a multi-user wireless communication system being extended from the two-layer phase shifting network of the vertical priority structure of FIG. 12a.

DETAILED DESCRIPTION OF PREFERRED EMBODIMENTS

Figure 1:
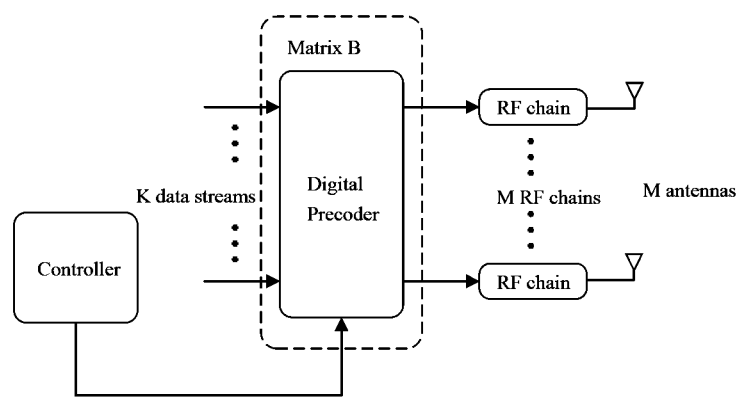
FIG. 1 is a diagram showing the structure of a prior art base station (BS).

Various exemplary embodiments of the present disclosure will now be described in detail with reference to the accompanying drawings. Notice that, unless otherwise specified, relative arrangement, numerical expressions and numerical values of components and steps set forth in these examples do not limit the scope of the invention.

Meanwhile, it should be understood that, for ease of description, dimensions of various parts shown in the drawings are not drawn in actual proportions.

The following description of at least one exemplary embodiment is in fact merely illustrative and is in no way intended to limit the invention, its application or use.

Techniques, methods, and apparatus known to those of ordinary skill in the relevant art may not be discussed in detail, but where appropriate, these techniques, methods, and apparatuses should be considered as part of the specification.

In all the examples shown and discussed herein, any specific value should be construed as merely illustrative and not as a limitation. Thus, other examples of exemplary embodiments may have different values.

Note that, similar reference numerals and letters denote similar terms in the accompanying drawings, and therefore, once an item is defined in a drawing, there is no need for further discussion in the accompanying drawings.

Digital Precoding—Digital Baseband Processing

In a conventional wireless communication system, usually, at a transmitting end (for example, a base station) and a receiving end (for example, a user equipment), each antenna is connected to one radio frequency (RF) chain for transmission and reception. Generally speaking, in operation, at the transmitting end, a data stream to be transmitted is first subjected to baseband processing, and then converted into a radio frequency signal via a radio frequency chain so as to be transmitted via a corresponding antenna, and a corresponding radio frequency chain at the receiving end receives the radio frequency signal and processes it into a baseband signal, and then the baseband signal is further subject to baseband processing to obtain a desired data stream.

Generally, in the baseband data processing, in order to facilitate a plurality of data streams multiplexing the same transmission resource and being transmitted via a radio frequency chain and a corresponding antenna, a digital precoding architecture is mainly used, in which respective magnitudes of signals transmitted over respective radio frequency chains each can be adjusted, to reduce interference between multiple channels of data signals carried on the same transmission resource. Such processing before data being transmitted via the radio frequency chain and antenna may be referred to as data baseband digital processing at the transmitting end.

For example, FIG. 1 schematically illustrates a conceptual structure of a prior art base station. As shown in FIG. 1, in a digital precoding architecture, the base station is equipped with M antennas (M is an integer and M≥1), and each antenna is arranged with a corresponding radio frequency chain. Under control of the controller, the digital precoder obtains a K-way data stream (K is an integer and K≥1), and digitally pre-codes the K-way data stream (for example, causing the K-way data stream to pass through a digital precoding matrix B of a size of M×K). The encoded data is transmitted to one or more user equipments via the radio frequency chains and the antennas.

Correspondingly, the user equipment can have a variety of configurations, so as to perform corresponding baseband digital processing after receiving the encoded data over the radio frequency chains to obtain the desired data stream.

Figure 2:
FIG. 2 is a diagram showing a user equipment (UE) equipped with a single antenna.

FIG. 2 shows a user equipment equipped with a single antenna. As shown in FIG. 2, the UE is equipped with a single antenna and a corresponding single RF chain. Since the user equipment has only one antenna, it can only receive a single data stream. That is to say, in the K-way data stream sent from the M antennas of the base station, only one data stream can be received by the UE by means of a corresponding digital processing.

Figure 3:
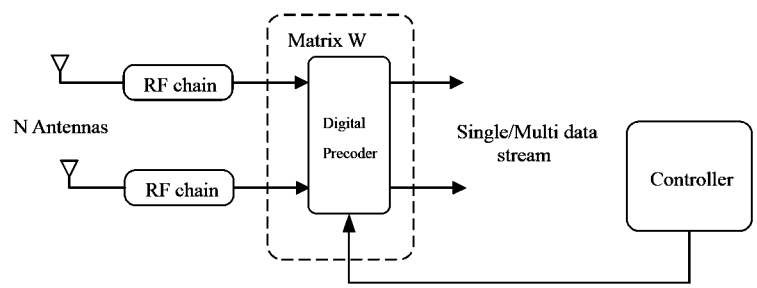
FIG. 3 is a diagram showing a user equipment equipped with a plurality of antennas.

FIG. 3 shows a user equipment equipped with multiple antennas. As shown in FIG. 3, the UE is equipped with N antennas (N is an integer and N>1). Each antenna transmits the received data to the digital precoder via a corresponding radio frequency chain. Under control of the controller, the digital precoder performs digital precoding on the received data by using, for example, a digital precoding matrix W of a size Ku×N (Ku is an integer and Ku≥1), thereby obtaining a single path data (when Ku=1) or multiplexed data (when Ku>1).

For the digital precoding matrix used in the digital precoder, there usually exists two design ways: a codebook-based way and a non-codebook based way. In a codebook-based design, the digital precoding matrix must be selected from preset codebooks. In a non-codebook based design, there is no such constraint. The base station and the UE can design the precoding matrixes according to Channel State Information (CSI).

The above digital precoding process can be considered as belonging to the baseband digital processing portion in the wireless communication.

Analog Beamforming—Radio Frequency Portion

Further, in a wireless communication system, especially a high frequency, such as millimeter wave, communication system, every RF chain can be connected to a plurality of phase shifters and antennas so that directional beams can be formed by using as few as one RF chain, thereby implementing an analog beamforming scheme. Analog beamforming training refers to a process of optimizing radio frequency configuration information of a base station and a user equipment (for example, configuration values of phase shifters related to the base station and the user equipment, also referred to as weight vectors for the phase shifters), and mainly functions as improving a reception signal to noise ratio for a user equipment. Taking the downlink as an example, a base station forms directional transmission beams by configuring values of a plurality of phase shifters connected to a plurality of antennas thereof, and the user equipment forms directional reception beams by configuring values of a plurality of phase shifters connected to the plurality of antennas thereof. A transmission beam of the base station and a reception beam of the user equipment form a beam pair for the downlink. The process of downlink beamforming training is a process which aims to find an optimal beam pair consisting of an optimal base station transmission beam and an optimal user equipment reception beam. Similarly, in the uplink, a base station reception beam and a user equipment transmission beam also form a beam pair.

A Millimeter wave communication system has multiple modes of operation, such as a point-to-point mode, a single-user mode, a multi-user mode, and the like. The point-to-point mode can be used for backhaul among base stations, the single-user mode and multi-user mode can be used for communication between a base station and one or more user equipments. With respect to the implementation architecture, a pure analog beamforming architecture (such as, a full-connection architecture, a sub-connection architecture without combining with digital pre-coding), a full-connection analog-digital hybrid precoding, a sub-connection analog-digital hybrid precoding, and the like can be included. However, no matter which architecture is adopted, the configuration information of the base station and the user equipment (for example, the configuration values of the phase shifters involving the base station and the user equipment) can be only selected from a predefined analog codebook, due to limitation from constraints for the apparatus. Such configuration information may be referred to as weight vectors, which generally refer to configuration values (e.g., phase values) for the plurality of phase shifters.

Such processing is mainly performed at respective radio frequency portions of a transmitting end and a receiving end of a wireless communication system, and can be considered as radio frequency analog processing.

Beamforming—Single User

The concept of beamforming technique will be exemplarily described below with reference to figures.

FIGS. 4a and 4b show configurations of a base station and a user equipment in a single-user system, respectively. As shown in FIG. 4a and FIG. 4b, in the user equipment and the base station, each radio frequency chain is connected with a set of phase shifters, and each phase shifter is connected to a corresponding antenna. The values (e.g., phase values) of a set of phase shifters may be indicated by a set of configuration parameters, such as DFT vectors, also referred to as weight vectors or beam vectors. Herein, we denote the weight vector of the base station as f and the weight vector of the user equipment as w. Since in the present example, a phase shifter only adjusts the phase of a signal without changing its magnitude, the magnitude of each element in the weight vector is one. In a millimeter wave communication system of this structure, since the number of radio frequency chains is limited, the base station end and the user equipment end cannot directly estimate the channel state information. Therefore, a common analog beamforming scheme uses a method based on analog Tx/Rx codebooks. A codebook is a collection of weight vectors. Let a codebook for the base station be F, with a size of P (including P weight vectors), the codebook for the user equipment be W, with a size of Q (including Q weight vectors), then the weight vector of the base station must be selected from the codebook F for the base station, the weight vector of the user equipment must be selected from the codebook W for the user equipment.

In millimeter wave communication between the base station and the user equipment, a weight vector in the codebook which is to be particularly employed shall be determined by beam training in advance. The beam training, for example, may employ a maximum signal-to-noise (SNR) ratio criterion to determine weight vectors used to form optimal beams, which may be expressed as:

$$\{w_{opt}, f_{opt}\} = \mathrm{argmax} |w^T H f| \text{ where } w \in W, f \in F$$

Where $H \in \mathbb{C}^{N \times M}$ represents a downlink channel between the base station and the user equipment, W is a candidate collection (codebook) for the weight vector of the user equipment, and F is a candidate collection (codebook) for the weight vectors of the base station, and $w_{opt}$, $f_{opt}$ are the determined optimal weight vector of the user equipment and of the base station, respectively.

Due to large attenuation in a millimeter-wave channel path, the millimeter-wave multipath channel has a small number of scatters, and a millimeter-wave channel H can usually be modeled as:

$$H = \sqrt{\frac{MN}{N_{cl}N_{ray}}} \sum_{i=1}^{N_{cl}} \sum_{l=1}^{N_{ray}} \alpha_{i,l} a_{UE}(\theta_{i,l}^{UE}, \phi_{i,l}^{UE}) a_{BS}^{H}(\theta_{i,l}^{BS}, \phi_{i,l}^{BS})$$

Where N and M respectively represent the number of antennas equipped by the UE and the base station, $N_{cl}$ is the number of scatters, $N_{ray}$ is the number of sub-paths included in each scatter, and $\alpha_{i,l}$ represents a channel coefficient of a corresponding scatter path, $a_{UE}$ and $a_{BS}$ represent antenna response vectors of the UE and the base station, respectively, and θ and φ are the horizontal and vertical angles of arrival, respectively.

For a uniform linear array (ULA), the antenna response vector is independent of the vertical angle of arrival φ, and can be expressed as $$a_{ULA}(\phi) = \frac{1}{\sqrt{N}}\left[1, e^{j\frac{2\pi}{d}\lambda\sin(\theta)}, \ldots, e^{j\frac{2\pi}{d}\lambda(N-1)\sin(\theta)}\right]^T$$

Where λ indicates wavelength, d indicates antenna pitch, and N indicates the number of antennas.

For a W×H Uniform Planar Array (UPA), where W is the number of horizontal antennas, H is the number of vertical antennas, the antenna response vector can be expressed as:

$$a_{UPA}(\phi, \theta) = a_h(\phi, \theta) \otimes a_v(\theta)$$

Where, $$a_h(\phi, \theta) = \frac{1}{\sqrt{W}}\left[1, e^{j\frac{2\pi}{d}\lambda\sin(\theta)\sin(\phi)}, \ldots, e^{j\frac{2\pi}{d}\lambda(W-1)\sin(\theta)\sin(\phi)}\right]^T$$

is the horizontal antenna response vector, $$a_v(\theta) = \frac{1}{\sqrt{H}}\left[1, e^{j\frac{2\pi}{d}\lambda\cos(\theta)}, \ldots, e^{j\frac{2\pi}{d}\lambda(H-1)\cos(\theta)}\right]^T$$

is the vertical antenna response vector, and ⊗ is Kronecker Product (KP).

Beamforming—Multi-User Hybrid Precoding

For a multi-user scenario, considering a single-cell multi-user millimeter-wave large-scale antenna system. The base station is equipped with W×H=M UPA antennas, and serves K users at the same time, and each user is equipped with N antennas. A traditional large-scale antenna system usually uses an all-digital precoding architecture to map K users' data to M RF chains and antenna elements through an all-digital precoding matrix $W \in \mathbb{C}^{M \times K}$, and optimal precoding performance can be obtained. However, this architecture requires M RF chains, resulting in high hardware complexity and high power consumption. Therefore, a hybrid precoding architecture is generally considered in multi-user millimeter-wave systems, which uses L (usually L=K, here assuming L=K) radio frequency chains to connect the baseband digital signal to antenna units through phase shifters. FIG. 5a and FIG. 5b show configurations of the base station and the user equipment in the analog-to-digital hybrid precoding architecture, respectively.

As shown in FIG. 5a, the base station side employing the analog-to-digital hybrid precoding architecture has a baseband digital precoder and an analog phase shifting network. Under control of a controller, the baseband digital precoder obtains K-way data streams as inputs, and the baseband digital precoder performs digital precoding on K-way data streams, thereby eliminating interference between different data streams. Then, K radio frequency chains process, such as up-convert, amplify, filter, etc., the data streams precoded by the digital precoder to generate radio frequency signals. Generally, each of the K radio frequency chains corresponds to one UE.

K radio frequency chains are connected to the analog phase shifting network. Values of individual phase shifters included in the analog phase shifting network constitute an analog beamforming matrix F. In the matrix F, the kth column represents values of a set of phase shifters connected to the kth radio frequency chain, expressed as a weight vector $f_k$, and the weight vector $f_k$ must be selected from a codebook f for the base station.

FIG. 5b shows the configuration of a user side in a hybrid precoding architecture. As shown in FIG. 5b, a user side is equipped with N antennas, and the signal received by each antenna is input to a radio frequency chain after passing through a corresponding phase shifter. Values of individual phase shifters constitute a weight vector $w_k$ for the user equipment, which can be selected from a codebook W for the user equipment. The radio frequency chain filters, amplifies, and downconverts the input signals to obtain digital received signals.

In this example, the user side has a plurality of radio frequency chains. According to the actual situation, it is also possible to adopt a design in which one radio frequency chain is employed at the user side.

In a hybrid precoding architecture, a downlink transmission mode can be expressed as:

$$y_k = w_k^T H_k F B x + w_k^T n_k$$

Where x is the transmitted signal, $y_k$ is the digital side receiving signal of the kth user, $H_k$ is the downlink channel matrix between the kth user and the base station, and F and B are the analog precoding and digital precoding matrix, respectively, and the analog precoding matrix F consists of analog transmission weight vectors (or beamforming vectors) composed of phases of phase shifters connected to respective radio frequency chains. $w_k$ represents the analog reception weight vector of the kth user, and $n_k$ represents the Gaussian white noise vector. Limited by the constraints of the apparatus, the analog transmit/reception weight vector can only be selected from a pre-defined simulation codebook, which is the simulation codebook F at the base station side and the simulation codebook W at the user side respectively.

In the hybrid precoding architecture, the beam training is a process of determining weight vectors of the base station and the user equipment from predetermined codebooks. Taking downlink transmission as an example, the maximum signal-to-noise ratio criterion can be expressed as:

$$\{w_{k,opt}, f_{k,opt}\} = \text{argmax} \|y_k\|$$

Where $\{w_{k,opt}, f_{k,opt}\}$ indicates an optimal downlink weight vector for the k-th user.

Design for Phases-Shifting Network

Figures 6A, 6B:
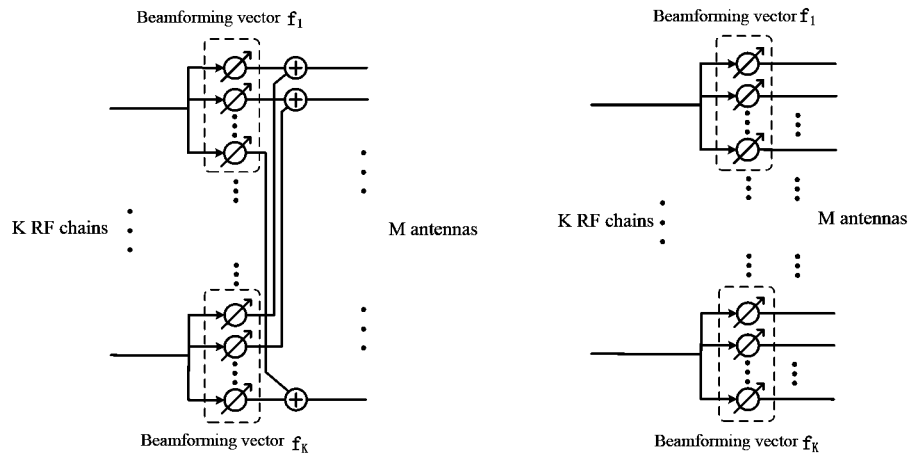
FIGS. 6a and 6b show schematic diagrams of a full-connection phase shifting network and a sub-connection phase shifting network, respectively.

It can be seen from FIGS. 4a, 4b, 5a and 5b that both the communication system using analog precoding and the communication system using analog-digital hybrid coding require beamforming training for transmission weight vectors and reception weight vectors, to find optimal transmission weight vectors and reception weight vectors. A weight vector is formed by values of a plurality of phase shifters connected to antennas or an antenna array. Therefore, a phase shifting network composed of connection of a plurality of phase shifters to a plurality of antennas is essential for beamforming. For a phase-shifting network, the currently popular architectures are a full-connection architecture and a sub-connection architecture. FIG. 6a and FIG. 6b show schematic diagrams of a full-connection phase shifting network and a sub-connection phase shifting network, respectively.

In a full-connection phase-shifting network, each RF chain can be connected to all antennas via analog phase shifters. Therefore, the full-connection phase shifting network can utilize a diversity gain of the entire antenna array to obtain better precoding performance. As shown in FIG. 6a, in a full-connection phase-shifting network, each radio frequency chain is connected to all antennas via phase shifters, wherein each radio frequency chain is connected to a set of M phase shifters, so that in the full-connection phase shifting network, there are K sets of phase shifters, and the total number of phase shifters is K×M. Signals (K signals) output from individual phase shifters in each set of phase shifters are added by an adder and supplied to a corresponding antenna unit. If phases of phase shifters connected to the k-th radio frequency chain create a M-dimensional beamforming vectors $f_k^{full}$, a M×K dimensional analog precoding matrix can be expressed as $F^{full}=[f_1^{full}, \ldots, f_K^{full}]$.

In a sub-connection phase-shifting network, each radio frequency chain can be connected to a part of the antennas via analog phase shifters. Usually, the antennas are evenly distributed to K radio frequency chains. Each antenna unit is connected to only one RF chain. Each RF chain in the sub-connection architecture can only utilize the diversity gain of a part of the antenna array, resulting in a certain performance loss, but at the same time the hardware complexity is greatly reduced. As shown in FIG. 6b, in the sub-connection phase-shifting network, the output of each radio frequency chain is connected to P phase shifters (P is an integer and P≥1), and each phase shifter is connected to one antenna unit. That is to say, in the case of having K radio frequency chains, the number of antenna units M=K×P. Phase values of phase shifters connected to the k-th radio frequency chain create a $$\frac{M}{K}$$

dimensional beamforming vectors $f_k^{sub}$, and thus a M×K dimensional analog precoding matrix can be expressed as:

$$F^{sub} = \begin{bmatrix} f_1^{sub} & 0_{M/K} & \cdots & 0_{M/K} \\ 0_{M/K} & f_2^{sub} & \cdots & 0_{M/K} \\ \vdots & \vdots & \ddots & \vdots \\ 0_{M/K} & 0_{M/K} & \cdots & f_K^{sub} \end{bmatrix}$$

Where $0_{M/K}$ indicates a zero column vector with a length of M/K.

The existing full-connection architecture performs well, but the hardware complexity is high. The sub-connection architecture has a low hardware complexity, but the performance loss is more serious, especially when the number of users increases. How to obtain a reasonable compromise between hardware overhead and system performance is an urgent problem to be solved in the industry. In addition, the full connection and sub-connection architecture or hybrid precoding architecture does not consider the physical structure of antennas. Therefore, it is important to consider the multi-antenna connection architecture and precoding design method in the scenario where the base station is equipped with a two-dimensional planar array antenna.

Hybrid Connection Architecture Based on Sub-Array

In this regard, the applicant proposes an improved hybrid connection architecture and a precoding design method.

In particular, in a wireless communication environment with large-scale antennas, a plurality of antennas may be arranged as an antenna array, such as a one-dimensional linear array, a two-dimensional planar array, or a curved surface array obtained by bending a two-dimensional planar array in a horizontal or vertical direction. In the case that multiple radio frequency chains share the antenna array, the antenna array may include the same number of multiple antenna sub-arrays as the radio frequency chains, each sub-array has several input terminals, and each input terminal may be connected to one radio frequency chain.

It should be noted that in some examples of physical implementation, one sub-array typically corresponds to a panel, and the division of antennas, the number and arrangement of sub-arrays are generally predetermined. Under this premise, the radio frequency chain usually has a one-to-one correspondence with the sub-array, and in some aspects of the present disclosure, it is further proposed that the radio frequency chain also utilizes sub-arrays other than the corresponding sub-array for communication.

In the context of the present disclosure, a first direction and a second direction are mutually orthogonal directions in a tangent plane of the antenna array. In particular, in the case where the antenna array is a two-dimensional planar array, the tangent plane is the plane of the two-dimensional planar array per se, and the first direction and the second direction are mutually orthogonal directions in the plane of the two-dimensional planar array, for example, horizontal and vertical directions.

In an improved embodiment of the present disclosure, at least one radio frequency chain may be in communication with a peer communication apparatus via a corresponding antenna sub-array, and further may be in communication with the peer communication apparatus via remaining sub-arrays other than the corresponding sub-array. Through such communication, appropriate communication configuration parameters can be determined for subsequent communication.

It should be noted that compared to an existing sub-connection phase-shifting network, the hybrid connection architecture based on a number of sub-arrays of the present application enables at least one radio frequency chain to utilize spatial diversities of more than one antenna sub-arrays of multiple antenna sub-arrays, thereby enhancing the beamforming gain. And compared to an existing full-connection architecture, the number of phase shifters required by some embodiments of the hybrid connection architecture based on a number of sub-arrays of the present application is significantly reduced.

According to one embodiment, an electronic equipment for a first communication apparatus of a wireless communication system is proposed. The first communication apparatus includes a number of antenna sub-arrays and a number of radio frequency chains. The electronic equipment includes a processing circuitry configured to: for each of at least one radio frequency chain of the number of radio frequency chains, perform a first communication with a second communication apparatus in the wireless communication system via a first one of the number of antenna sub-arrays corresponding to the radio frequency chain, so that a first communication configuration parameter is determined; and performs a second communication with the second communication apparatus via at least one of remaining sub-arrays of the number of sub-arrays other than the corresponding first sub-array, so that a second communication configuration parameter is determined, wherein a communication configuration parameter for the radio frequency chain is determined based on the first communication configuration parameter and the second communication configuration parameter.

That is, both the first communication and the second communication can be performed for at least one of all radio frequency chains, thereby determining a communication configuration parameter for each radio frequency chain based on the first communication configuration parameter and the second communication configuration parameter. And for the remaining radio frequency chains, only the first communication can be performed, such that communication configuration parameters for the radio frequency chains are determined by the first communication configuration parameter.

In an exemplary implementation, in a case that a radio frequency chain only performs a first communication via its corresponding antenna sub-array for determining a first communication configuration parameter, a communication configuration parameter for the radio frequency chain is the first communication configuration parameter, and in a case that a radio frequency chain performs a first communication and a second communication for determining a first communication configuration parameter and a second communication configuration parameter respectively, a communication configuration parameter for the radio frequency chain can be obtained by synthesis of the first configuration parameter and the second communication configuration parameter.

In some examples, the first communication configuration parameter may be predetermined by the processing circuitry, or determined by an apparatus other than the first communication apparatus and transmitted to the first communication apparatus.

Preferably, the first communication configuration parameter and the second communication configuration parameter may be expressed in various forms, and the synthesis of the first communication configuration parameter and the second communication configuration parameter may be performed in a combination manner corresponding to the parameter expression manner.

In some embodiments, both the first communication configuration parameter and the second communication configuration parameter can be expressed in a vector form, such that the synthesis of the first communication configuration parameter and the second communication configuration parameter can be expressed as a combination of vectors, such as a combination of vectors obtained in a well known manner in the art.

In a preferred implementation, in the second communication, one radio frequency chain will perform a second communication with each sub-array of the number of sub-arrays other than the corresponding sub-array, thereby determining the second communication configuration parameter. In this way, each RF chain can utilize spatial diversities of all antenna sub-arrays in a plurality of antenna sub-arrays such that the beamforming gain is further optimized.

In another preferred implementation, in the second communication, one radio frequency chain is not connected to all sub-arrays in the number of sub-arrays other than the corresponding sub-array, but only to a specific number of sub-arrays therein. Thus, although the spatial diversities of all antenna sub-arrays cannot be utilized, antenna arrangement complexity and hardware overhead are appropriately reduced, thereby achieving a more appropriate compromise between the gain and the complexity as well as hardware overhead. In a particular design, selection of the specific number may be determined based on factors on the first communication apparatus side, such as actual circuit arrangement requirements, performance requirements, etc.

In yet another alternative implementation, in a number of radio frequency chains, a specific number of radio frequency chains each only communicates with its corresponding antenna sub-array, instead of the remaining antenna sub-arrays, and in addition to their respective corresponding antenna sub-arrays, other radio frequency chains may be in communication with a specific number of antenna sub-arrays or all antenna sub-arrays in the remaining antenna sub-arrays, as described above. Thus, although spatial diversities of all antenna sub-arrays cannot be utilized, the antenna arrangement complexity is appropriately reduced, thereby achieving a more appropriate compromise between gain and antenna complexity. In a particular design, selection of the specific number may be determined based on factors on the first communication apparatus side, such as actual circuit arrangement requirements, performance requirements, etc.

According to an embodiment, the first communication configuration parameter is determined based on information on a communication channel state in the first communication received from the second communication apparatus, and the second communication configuration parameter is determined based on information on a communication channel state in the second communication received from the second communication apparatus.

According to an embodiment, the first communication configuration parameter is a communication configuration parameter that optimizes channel quality of the first communication, and the second communication configuration parameter is a communication configuration parameter that optimizes channel quality of the second communication.

According to an embodiment, the second communication configuration parameter comprises second communication configuration parameters corresponding to at least one of remaining sub-arrays in a plurality of sub-arrays other than the corresponding sub-array.

According to an embodiment, the first communication configuration parameter comprises an analog beamforming vector when the radio frequency chain performs communication via the corresponding first sub-array; and wherein the second communication configuration parameter comprises analog beamforming vectors for at least one sub-array of remaining sub-arrays of the plurality of sub-arrays other than the corresponding first sub-array when the radio frequency chain performs communication via the at least one sub-array.

When performing the second communication, the radio frequency chain may perform communication via the at least one sub-array of the remaining sub-arrays of the plurality of antenna sub-arrays other than the corresponding sub-array by using the determined analog beamforming vector included in the first communication configuration parameter. For example, the radio frequency chain can perform the second communication by using the analog beamforming vector determined by the radio frequency chain itself in the first communication process, or can perform the second communication by using an analog beamforming vector determined for a specific sub-array in the first communication process when the radio frequency chain performs the second communication with the specific sub-array.

According to an embodiment, a phase shifter is disposed between a radio frequency chain and a sub-array, wherein a phase shifter between a radio frequency chain and a corresponding first sub-array is set by the first communication configuration parameter, and phase shifters between the radio frequency chain and the remaining sub-arrays are set by the second communication configuration parameter corresponding to the remaining sub-arrays. That is, in an implementation, the first configuration parameter may further include a phase of the phase shifter when the radio frequency chain communicates with the corresponding sub-array, and the second configuration parameter may further include phases of the phase shifters when the radio frequency chain communicates with the remaining sub-arrays other than the corresponding sub-array.

According to an embodiment, the first communication configuration parameter includes a power allocation factor for a corresponding first sub-array when the radio frequency chain performs communication via the corresponding first sub-array, and the second communication configuration parameter includes power allocation factors for remaining sub-arrays of the plurality of sub-arrays other than the corresponding sub-array when the radio frequency chain performs communication via at least one of the remaining sub-arrays.

Considering that beamforming vectors for respective sub-arrays can change once in a longer period after determination thereof, weight parameters of the respective sub-arrays for a particular communication chain (for example, other configuration parameters other than to the beamforming vector) can be changed in a shorter period to compensate for channel variations, thereby reducing reconfiguration overhead. Especially in an example of the two-layer phase-shifting network, since the amplitude of motion of the user equipment in vertical direction is generally small, a vertical beamforming vector of each sub-array can change once in a longer period after determination thereof, and a horizontal beamforming vector is adjusted in a shorter period according to the latest channel condition.

Figure 7A:
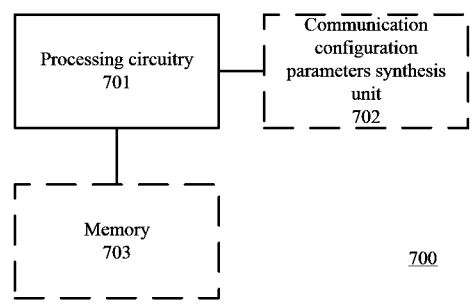
FIG. 7a shows a schematic diagram of an electronic equipment for a communication apparatus in a wireless communication system, in accordance with one embodiment of the present invention.

To further facilitate understanding, an implementation of an embodiment of the present invention where the first communication apparatus is a base station and the second communication apparatus is a user equipment will be described below with reference to FIG. 7a. FIG. 7a shows the base station having a processing circuitry 701, and optionally, a communication configuration parameter synthesis unit 702 and a memory 703, as indicated by dashed boxes in the figure. Note that such description is just as an example, instead of limitation.

According to an embodiment, the first communication configuration parameter determined based on the first communication and/or the second communication configuration parameter determined based on the second communication can be stored in the memory 703 of the first communication apparatus. It should note that the memory 703 is not necessary for the first communication apparatus 700. In some embodiments, the first communication configuration parameter and second communication configuration parameter can be stored in a storage device out of the first communication apparatus, or stored in different storage devices separately, for example, stored in storage devices inside and outside of the first communication apparatus 700 separately. In some embodiments, the first communication configuration parameter and/or the second communication configuration parameter may be directly transmitted to the communication configuration parameter synthesis unit 702 to be combined into a communication configuration parameter for a corresponding radio frequency chain.

The communication configuration parameter synthesis unit 702 can combine the input first and second communication configuration parameters to determine a configuration parameter for a radio frequency chain, but the communication configuration parameter synthesis unit 702 is also optional. Alternatively, the first communication configuration parameter and the second communication configuration parameter may be determined at the second communication apparatus (in this example, the user equipment) or other apparatus, and can be used to obtain the communication configuration parameter for the radio frequency chain, and then the communication configuration parameter for the radio frequency chain is transmitted from the user equipment to the first communication apparatus (in this example, the base station).

In operation, the processing circuitry 701 can be used to configure signal transmission of the base station such that each radio frequency chain performs a first communication via a corresponding sub-array, respectively, so that the first communication configuration parameter is determined, and such that each of the at least one radio frequency chain can also perform a second communication with at least one sub-array other than its corresponding sub-array so that the second communication configuration parameter is determined.

In an embodiment, a phase shifting network composed of a plurality of phase shifters is disposed between the plurality of radio frequency chains and the plurality of sub-arrays of the base station. The processing circuitry 701 configures a radio frequency chain to perform the first communication via the corresponding sub-array and the second communication via the at least one sub-array other than the corresponding sub-array, respectively, by configuring values of individual phase shifters in the phase-shifting network. After the first communication configuration parameter and the second communication configuration parameter are obtained, the first communication configuration parameter may be used to set a value of a phase shifter between the radio frequency chain and the corresponding sub-array when the radio frequency chain performs subsequent communication, and the second communication configuration parameter can be used to set values of phase shifters between the radio frequency chain and the at least one sub-array other than the corresponding sub-array when the radio frequency chain performs subsequent communication.

According to one embodiment, an electronic equipment for a second communication apparatus of a wireless communication system is proposed. For example, the electronic equipment can include a processing circuitry configured to: for a corresponding radio frequency chain of a first communication apparatus, acquire channel state information in a first communication by the first communication apparatus performing with respect to the second communication apparatus via a first one of a plurality of antenna sub-arrays of the first communication apparatus corresponding to the radio frequency chain, so that a first communication configuration parameter is determined based on the channel state information in the first communication; and acquire channel state information in a second communication by the first communication apparatus performing with respect to the second communication apparatus via at least one of remaining sub-arrays of the plurality of sub-arrays of the first communication apparatus other than the corresponding first antenna sub-array, so that a second communication configuration parameter is determined based on the channel state information in the second communication, wherein a communication configuration parameter for the corresponding radio frequency chain can be determined by using the first communication configuration parameter and the second communication configuration parameter.

Figure 7B:
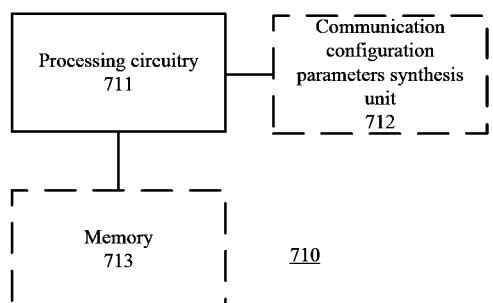
FIG. 7b shows a schematic diagram of an electronic equipment for another communication apparatus in a wireless communication system, in accordance with one embodiment of the present invention.

An exemplary description will be made below with reference to FIG. 7b, which shows a schematic diagram of an electronic equipment for a second communication apparatus in a wireless communication system in accordance with one embodiment of the present invention. The second communication apparatus is for communicating with the communication apparatus of FIG. 7a. For example, when the electronic equipment 700 of FIG. 7a is located in a base station, the electronic equipment 710 of FIG. 7b is in a user equipment. When the electronic equipment 700 of FIG. 7a is located in a user equipment, the electronic equipment 710 of FIG. 7b is in a base station. An example in which the electronic equipment of FIG. 7b is located in the user equipment will be described below.

As shown in FIG. 7b, the electronic equipment 710 can include a processing circuitry 711, and optionally a communication configuration parameter synthesis unit 712 and a memory 713.

Memory 713 can be used to store the first communication configuration parameter and the second communication configuration parameter, like memory 703 in FIG. 7a. Like memory 703, this memory 711 is also not necessary for the electronic equipment 710.

In operation, for a radio frequency chain of the first communication apparatus, the first communication apparatus may perform the first communication to the second communication apparatus via a first antenna sub-array of a plurality of antenna sub-arrays of the first communication apparatus corresponding to the radio frequency chain, and performs a second communication to the second communication apparatus via at least one of the remaining antenna sub-arrays of the plurality of antenna sub-arrays other than the corresponding first antenna sub-array. The processing circuitry 711 can determine information about the channel states in the first communication and the second communication based on the first communication and the second communication, respectively. The first communication configuration parameter may be determined based on channel state information in the first communication, and the second communication configuration parameter may be determined based on channel state information in the second communication. In some embodiments, the first communication configuration parameter and the second communication configuration parameter optimize channel quality of the first communication and the second communication, respectively. The determination of the first communication configuration parameter and the second communication configuration parameter may be performed by the processing circuitry 711 and then be transmitted to the first communication apparatus, stored in the memory 713, or transmitted to the communication configuration parameter synthesis unit 712.

The communication configuration parameter synthesis unit 712 obtains communication configuration parameters for respective radio frequency chains based on the first communication configuration parameter and the second communication configuration parameter, and transmits them to the first communication apparatus under the control of the processing circuitry 711. Also, the communication configuration parameter synthesis unit 712 is optional. As described above, the communication configuration parameters for the respective radio frequency chains may be determined by the processing circuitry of the first communication apparatus, or by other apparatuses than the first communication apparatus and the second communication apparatus.

According to one embodiment, a method for a first communication apparatus of a wireless communication system is proposed. The first communication apparatus is provided with a number of antenna sub-arrays and a number of radio frequency chains. The method comprises: for each of at least one radio frequency chain of the number of radio frequency chains, performing a first communication with a second communication apparatus in the wireless communication system via a first one of the number of antenna sub-arrays corresponding to the radio frequency chain, so that a first communication configuration parameter is determined; and performing a second communication with the second communication apparatus via at least one of remaining sub-arrays of the number of sub-arrays other than the corresponding first sub-array, so that a second communication configuration parameter is determined, wherein a communication configuration parameter for the radio frequency chain is determined based on the first communication configuration parameter and the second communication configuration parameter.

According to one embodiment, a method for a second communication apparatus of a wireless communication system is proposed. The method comprises: for a corresponding radio frequency chain of a first communication apparatus in the wireless communication system, acquiring channel state information in a first communication by the first communication apparatus performing with respect to the second communication apparatus via a first one of a plurality of antenna sub-arrays of the first communication apparatus corresponding to the radio frequency chain, so that a first communication configuration parameter is determined based on the channel state information in the first communication; and acquiring channel state information in a second communication by the first communication apparatus performing with respect to the second communication apparatus via at least one of remaining sub-arrays of the plurality of sub-arrays of the first communication apparatus other than the corresponding first antenna sub-array, so that a second communication configuration parameter is determined based on the channel state information in the second communication.

According to an embodiment, a communication configuration parameter for the corresponding radio frequency chain can be determined by using the first communication configuration parameter and the second communication configuration parameter.

An exemplary implementation of a sub-array-based communication configuration process in accordance with an embodiment will be described below with reference to the accompanying drawings. It should be noted that, for ease of understanding, the following description takes a two-dimensional planar antenna array as an example, but it should be noted that the described embodiment is equally applicable to other types of antenna arrays, for example, a shifting antenna array which can be divided into multiple sub-arrays, curved antenna arrays, and the like. For example, in the case of a curved antenna array, the plane mentioned in the following description is the tangent surface of the curved antenna array.

Figure 8:
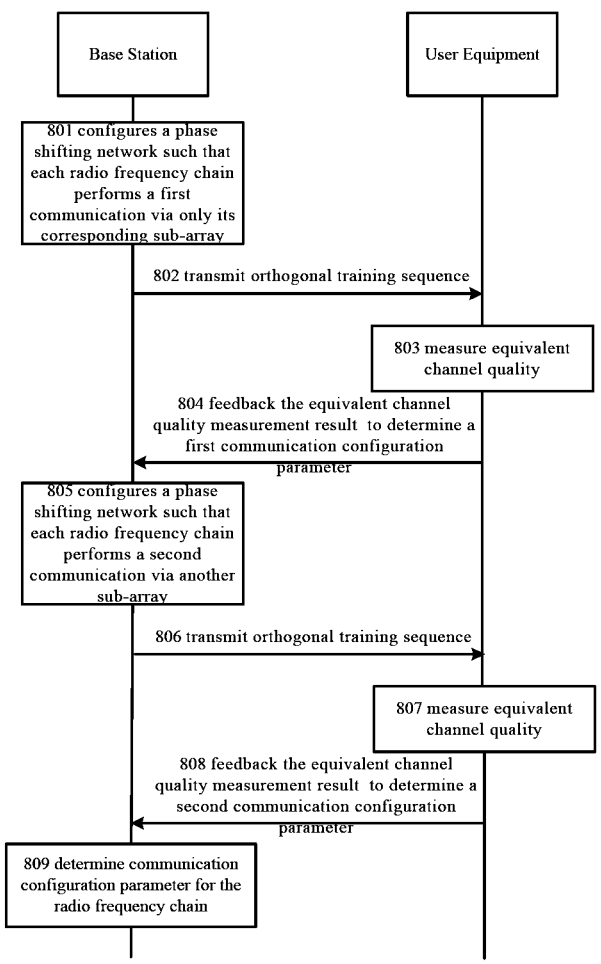
FIG. 8 shows a flow chart of beamforming training in a base station by using the electronic equipment of FIG. 7a and/or FIG. 7b, in accordance with one embodiment of the present invention.

FIG. 8 illustrates a flowchart of communication configuring performed in a base station by using the electronic equipments of FIG. 7a and FIG. 7b in accordance with an embodiment of the present invention.

As shown in FIG. 8, in step 801, the base station configures a phase shifting network such that each of the at least one radio frequency chains of all radio frequency chains performs a first communication via only its corresponding sub-array. Specifically, in one example, a first radio frequency chain corresponds to a first sub-array, in other words, data stream of the first radio frequency chain is mainly transmitted by the first sub-array, and the base station utilizes weight vectors in an analog transmission codebook for the first sub-array to configure phase shifters of the first sub-array one by one so as to scan all transmitted beams.

At step 802, the base station transmits an orthogonal training sequence to the user equipment based on the configuration at step 801. Specifically, the training sequences transmitted by multiple radio frequency chains connected to the base station to multiple user equipments are specific to radio frequency chains and orthogonal to each other, so that the multiple radio frequency chains can perform transmission to multiple user equipments in parallel. Each user equipment can receive a corresponding training sequence signal through match filtering without interfering with each other.

At step 803, the user equipment uses the processing circuitry 712 to estimate equivalent channel information from the respective radio frequency chains to the respective user equipments based on the received training sequence. Specifically, in one example, the user equipment configures phase shifters for its antenna array one by one by using weight vectors in its analog reception codebook to scan all the reception beams so as to receive beamforming training signals from the base station, thereby determining a transmission-reception beam pair with an optimal reception condition from various transmission-reception beam pairs, such as a pair with maximum RSRP (Reference Signal Received Power)/RSRQ (Reference Signal Received Quality)/CQI of the received signal. The user equipment can also calculate the channel condition of an equivalent channel corresponding to the optimal transmission-reception beam pair, such as channel gain and channel phase/direction, as part of the measurement result. In some alternative examples, the user equipment provides channel conditions of equivalent channels corresponding to all transmission-reception beam pairs as measurement results to the base station.

At step 804, the user equipment feeds back the equivalent channel estimation result in step 803 to the base station to determine, by the base station, a first communication configuration parameter for a corresponding radio frequency chain based on the equivalent channel estimation result. Alternatively, the first communication configuration parameter may also be determined by the user equipment or other apparatus and transmitted to the base station. The first communication configuration parameter is typically a communication configuration parameter that optimizes the channel quality of the first communication.

The first communication configuration parameter may include an optimal transmission weight vector in the base station analog codebook. After the training is finally completed, the base station may configure antenna phase values of sub-arrays corresponding to the radio frequency chain for the user equipment by using the optimal transmission weight vector, to transmit an optimal transmit beam for the user equipment. It can be understood that the user equipment further configures phase values of its antenna array according to an optimal receiving weight vector in the analog codebook to generate an optimal reception beam corresponding to the optimal transmit beam, and performs subsequent data signal communication based on the optimal beam pair. In an example in which the user equipment includes the first communication configuration parameter in the feedback result, in order to reduce the control signaling overhead, the first communication configuration parameter may also be an optimal transmission weight vector in the base station analog codebook or an indication of the optimal transmission beam, such as an index. In a specific example, the transmission resources where each base station transmission beam is located are different from each other, and the user equipment feeds back the indication of the resource where the optimal transmit beam is located to feed back the first communication configuration parameter.

The idea of the embodiment on which FIG. 8 is based is that data stream on one radio frequency chain can be wirelessly transmitted through multiple sub-arrays to obtain a spatial diversity gain. In an optimal implementation, further consideration is given to how to coordinate multiple sub-arrays to carry data flows for a particular radio frequency chain. In the optimal solution, the first communication configuration parameter may also include a weight parameter for a corresponding sub-array. The weight parameter may include an additional phase, and then the equivalent channel quality measurement result includes the phase of the equivalent channel. The weight parameter may also include a power allocation factor for the corresponding sub-array. The power allocation factor is determined by normalizing total power of the radio frequency chain on individual sub-arrays. The equivalent channel estimation result includes a gain for the equivalent channel.

In one implementation, the phase and gain of the equivalent channel can be estimated simultaneously in the same communication process. The optimal transmission weight vector and sub-array additional phase, power allocation factor, etc. can be obtained simultaneously in the same communication process. For example, when phase shifter equipments in the phase shifting network of the base station antenna have sufficient precisions, the sub-array additional phase and the transmission weight vector can be implemented together by the phase shifting network.

In another implementation, the optimal transmission weight vector and sub-array additional phase may also be obtained separately in different communication flows. For example, the sub-array additional phase may be updated at a different frequency from that for the optimal transmission weight vector, so they may be obtained in separate flows that are performed in different cycles. As another example, when the precision of the phase shifter equipment of the base station antenna for setting the transmission weight vector cannot support, a separate additional phase shifter can be provided to set the additional phase.

Moreover, in an exemplary implementation, a power allocation factor is not necessary, so when estimating the first communication configuration parameter based on channel quality, only the transmission weight vector and/or the additional phase are estimated without estimating the gain of the equivalent channel.

At step 805, the base station configures the phase shifting network such that each radio frequency chain performs a second communication via at least one of the plurality of sub-arrays other than a corresponding sub-array.

At step 806, the base station transmits an orthogonal training sequence to the user equipment based on the configuration at step 805.

At step 807, the user equipment uses the processing circuitry 712 to estimate equivalent channel information from respective radio frequency chains to respective user equipments based on the received training sequence.

At step 808, the user equipment feeds back the equivalent channel estimation result in step 807 to the base station to determine, by the base station, the second communication configuration parameter for a corresponding radio frequency chain based on the equivalent channel estimation result. Likewise, as in step 804, the second communication configuration parameter can also be determined by the user equipment or other apparatus and transmitted to the base station.

The second communication configuration parameter may include information indicating an optimal transmission weight vector in the second communication, and may further include a weight parameter of a second sub-array for the transmission service of the first radio frequency chain, and the weight parameter may include, for example, additional phase configuration information, power allocation factor, etc. The additional phase can be set as the conjugate of the equivalent channel phase provided by the second sub-array for phase correction, to obtain additional spatial diversity gains to a maximum extent. In this example, the additional phase can be superimposed on the basis of the optimal transmission weight vector to configure phase shifters of the second sub-array used of the first radio frequency chain for actual data transmission.

For each radio frequency chain, the second communication is performed for at least one of a plurality of sub-arrays other than a corresponding sub-array. In some embodiments, the second communication can be performed for each of the plurality of sub-arrays other than the corresponding sub-array. That is, when there are K radio frequency chains and corresponding K sub-arrays, steps 805-808 in the second communication can be repeated up to K−1 times for each radio frequency chain.

Similar to the first communication, in an exemplary implementation, the power allocation factor in the second communication is not necessary, so when estimating the second communication configuration parameter based on the channel quality, only the transmission weight vector and the additional phase are estimated, without estimating the gain of the equivalent channel.

Similarly, similar to the first communication, in an exemplary implementation, the optimal transmission weight vector and the sub-array additional phase, the power allocation factor, and the like in the second communication configuration parameter may be obtained simultaneously in the same communication process, or may be obtained in separate communication processes with different cycles.

The determining processes for the second communication configuration parameters in steps 805 to 808 may be performed in various manners, for example, the determining processes for the second communication configuration parameter may be configured just like the first communication process, or may be performed in a simple manner by utilizing the configuration result based on the first communication. The determination for the second communication configuration parameter will be described in detail later with reference to FIGS. 9a to 9c.

At step 809, the base station determines a communication configuration parameter for each radio frequency chain based on the first communication configuration parameter and the second communication configuration parameter. Alternatively, this operation can also be completed by another apparatus other than the base station and the user equipment, and then the communication configuration parameter for each radio frequency chain is transmitted to the base station.

The above description of FIG. 8 is merely an example and is not intended to limit. It should be noted that some implementations in the process described with respect to FIG. 8, such as determination of the first communication configuration parameter, the second communication configuration parameter, and the communication configuration parameters in step 809, may be alternatively implemented as described above.

Figure 9A:
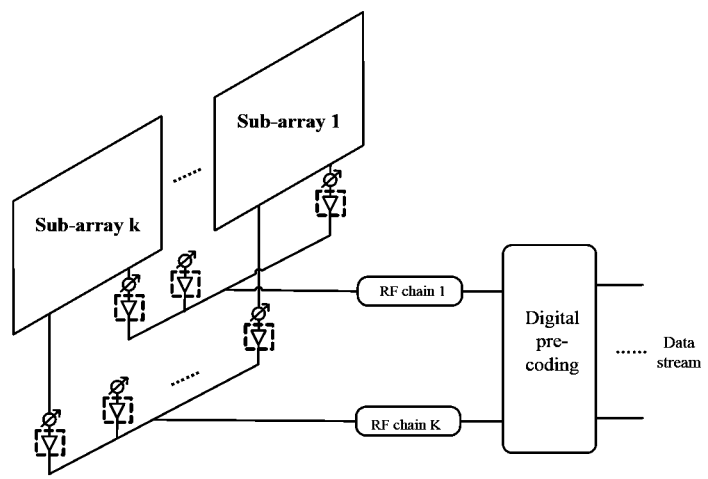
FIG. 9a shows a schematic diagram of a hybrid connection architecture based on a number of sub-arrays for an exemplary base station employing the communication configuration process depicted in FIG. 8.
Figure 9B:
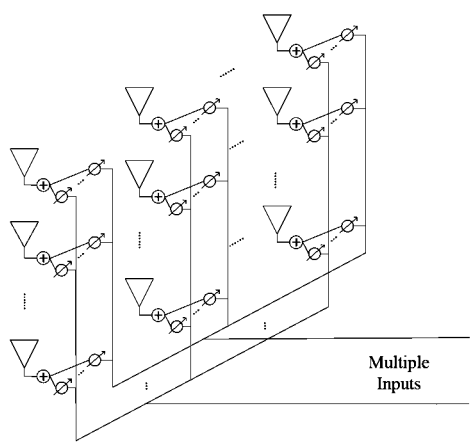

FIG. 9a shows a schematic diagram of a multi-sub-array based hybrid connection structure of an exemplary base station that can employ the communication configuration process depicted in FIG. 8, and FIG. 9b shows a schematic diagram of a phase-shifting network for each antenna sub-array in the example base station as shown in FIG. 9a. As shown in FIG. 9a, a planar array antenna can be arranged as K sub-arrays corresponding to K radio frequency chains, each input of a sub-array is connected to an RF chain via an additional phase shifter and a radio frequency power amplifier, wherein the radio frequency power amplifier is an optional component. Under this architecture, each RF chain is connected to K sub-arrays, and the phases and amplitudes of signals to individual sub-arrays are controlled by respective additional phase shifters and RF power amplifiers. Assume that the additional phase of the phase shifter for the $k^{th}$ RF chain connecting to of the $i^{th}$ sub-array is represented as $e^{j\Theta_{k,i}}$, and the normalized power allocation factor for the RF power amplifier is $\alpha_{k,i}$.

FIG. 9b illustrates a detailed implementation of the sub-arrays of FIG. 9a. As shown in FIG. 9b, each sub-array has several input terminals, each of which can be connected to a radio frequency chain. Each input terminal is connected to respective antenna units via phase shifters. The phases for the phase shifters connected between each input and all antenna units constitute a beamforming vector. It is assumed that the $k^{th}$ radio frequency chain transmits a corresponding beamforming vector through the $i^{th}$ sub-array, denoted as $f_{k,i}$.

Figure 9C:
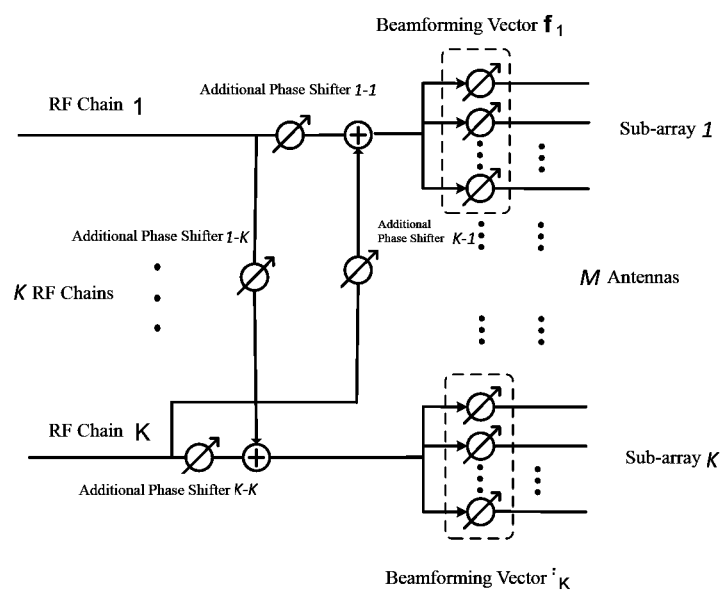

FIG. 9c illustrates another detailed implementation of the sub-arrays of FIG. 9a, where each sub-array is connected to only one set of phase shifters and is shared by multiple radio frequency chains. As shown in FIG. 9c, each sub-array has only one input terminal, and each radio frequency chain is connected to the input terminals of respective sub-arrays via additional phase shifters. For example, the radio frequency chain 1 is connected to the sub-array 1 corresponding thereto via an additional phase shifter 1-1, and is connected to the k-th sub-array in other sub-arrays via an additional phase shifter 1-k. The phases of phase shifters connected between each input terminal and all antenna elements constitute a beamforming vector. It is assumed that the kth radio frequency chain transmits a corresponding beamforming vector through the i-th sub-array, denoted as $f_{k,i}$.

The determination process of the second communication configuration parameter described above will be described below with reference to FIGS. 9b and 9c.

In a specific example, such as FIG. 9b, each sub-array is connected to multiple sets of phase shifters and each set of phase shifters is exclusively owned by one radio frequency chain. Specifically, steps 805 and 806 cause the first radio frequency chain to transmit signals only via the second sub-array, and scan transmission weight vectors for the phase shifters of the second sub-array for the first radio frequency chain according to the analog codebook in a manner similar to the first communication process, to transmit the training sequence; in step 807, the user equipment served by the first radio frequency chain receives the scanning transmitted training sequence by using an optimal reception weight vector determined by the first communication process, and according to the reception situation, determines an optimal base station transmission weight vector and an optimal channel gain, channel phase/direction, etc. of the equivalent channel as equivalent channel states for feedbacking to the base station. And so on, until the second communication between the first radio frequency chain and a specific number of remaining sub-arrays, as well as the second communication between other radio frequency chains and sub-array, are finished. It can be understood that the second communication process is not optimal for signal transmission from the first radio frequency chain to its user equipment, but can also provide a certain spatial diversity gain.

According to an embodiment, the second communication, for example based on FIG. 9b, can also be carried out in a simplified form. In one implementation, when performing the second communication, a radio frequency chain performs communication by using the determined analog beamforming vector for the radio frequency chain included in the first communication configuration parameter via at least one of the remaining sub-arrays of a plurality of sub-arrays other than the corresponding sub-array.

For example, the radio frequency chain performs the second communication by using the determined optimal transmission weight vector corresponding to the radio frequency chain included in the first communication configuration parameter via the sub-arrays of the plurality of sub-arrays other than the corresponding sub-array. For each radio frequency chain, the same optimal transmit beam is used for at least two sub-arrays.

In another example of a connection structure, such as corresponding to FIG. 9c, each sub-array is connected to only one set of phase shifters and is shared by multiple radio frequency chains. Specifically, the first communication process determines an optimal transmission weight vector of each primary service sub-array for each radio frequency chain and an optimal reception weight vector of each user equipment itself. On this basis, by way of example, step 805 causes the first radio frequency chain to transmit signals only via a second sub-array, while the transmission weight vectors of phase shifters for the second sub-array are fixed to optimal transmission weight vectors used for the second radio frequency chain determined in the first communication process; in step 806, the second sub-array transmits an orthogonal training sequence for the first radio frequency chain by means of optimal transmission weight vectors for the second radio frequency chain, and the user equipments served by the first radio frequency chain perform reception by using the optimal reception weight vectors determined in the first communication process, and in step 807, the channel gain, channel phase/direction are determined according to the reception situation and be fedback as equivalent channel states to the base station, until the second communication between the first radio frequency chain and a specific number of remaining sub-arrays as well as the second communication between the other radio frequency chains and sub-array are completed. It will be understood that the second communication process may be not optimal for signal transmission from the first radio frequency chain to its user equipment, but may still provide a certain spatial diversity gain.

In this example, the second communication configuration parameter corresponds to a weight parameter of a transmission service by the second sub-array for the first radio frequency chain, and the weight parameter includes, for example, additional phase configuration information, the additional phase may be set to the conjugate of an equivalent channel phase provided by the second sub-array for performing phase correction so as to obtain an additional spatial diversity gain to a maximum extent. In this example, an additional phase shifter can be disposed between the first radio frequency chain and the second sub-array to provide the additional phase described above.

A precoding process will be described next with reference to the drawings. In a configuration of a multi-sub-array based hybrid connection architecture to which the present disclosure relates, the precoding process typically includes determining communication configuration parameters, such as the first and second communication configuration parameters, according to, for example, the processes described above, and performing communication between the base station and the user equipment by utilizing the determined configuration parameters, thereby determining a digital precoding matrix based on the fedback channel communication status, such as PMI, CQI, etc., followed by precoding.

Figure 10A:
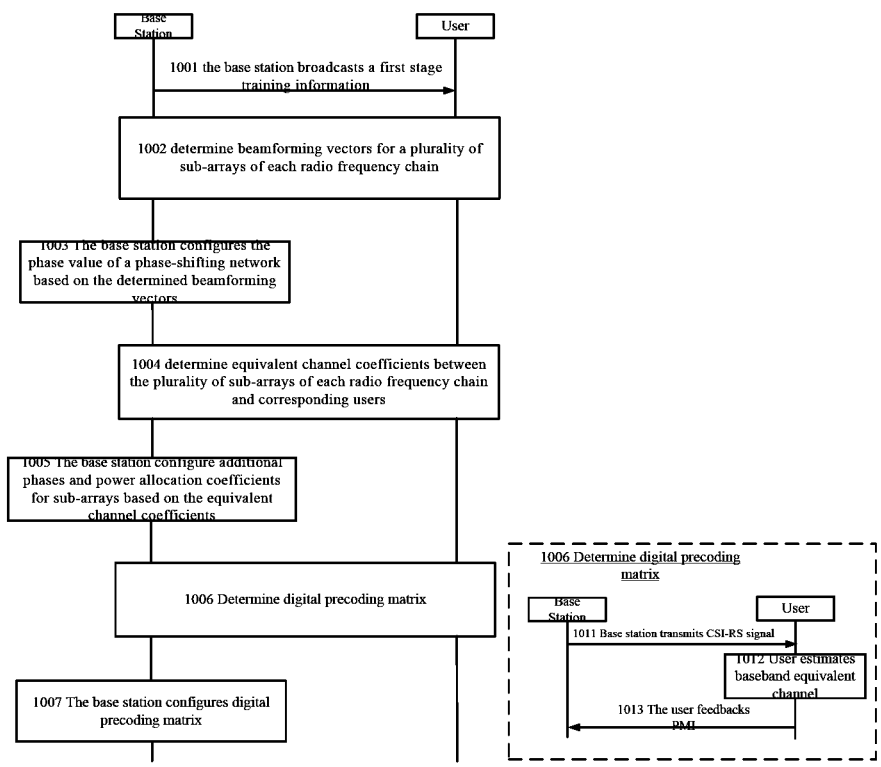
FIGS. 10a and 10b illustrate an exemplary precoding process for an exemplary base station based on a multi-subarray hybrid connection architecture.

In an implementation, for the exemplary base station in the multi-sub-array based hybrid connection architecture in FIG. 9a, the precoding process can be divided into three phases: 1. Determining a beamforming vector of each sub-array, that is, determining the aforementioned beamforming vector $f_{k,i}$ or $f_k$; 2. Determining additional phases of phase shifters and power allocation factors of radio frequency power amplifiers for a radio frequency chain connecting to respective sub-arrays, that is, determining the aforementioned $e^{j\Theta_{k,i}}$ and $\alpha_{k,i}$; 3. Determining a digital precoding matrix. FIG. 10a illustrates an exemplary precoding process for an exemplary base station in the multi-subarray based hybrid connectivity architecture.

It should be noted that the precoding process illustrated in FIG. 10a is merely exemplary, and such precoding process is particularly beneficial where the transmit beamforming vector and the transmit configuration parameters, such as phase, of a sub-array are varied/updated in different periods. For example, considering that beamforming vectors of respective sub-arrays are determined to be changed once in a longer period, weight parameters (for example, other configuration parameters other than the beamforming vector) of the respective sub-arrays for a particular communication link can be changed in a shorter period to compensate for channel variations, thereby reducing reconfiguration overhead.

The process is described with the specific architecture corresponding to FIG. 9b as an example. In a first stage, step 1002, beamforming vectors for a plurality of sub-arrays of each radio frequency chain are determined.

In the sub-array-based hybrid connection architecture, the channel matrix between a target user of a radio frequency chain k, $1 \leq k \leq K$ and all antennas is obtained by combining channel matries for each sub-array, i.e., $H_k=[H_{k,1}, H_{k,2}, \ldots, H_{k,K}]$, where $H_{k,i}$ represents a channel matrix between the target user of the kth radio frequency chain and the i-th sub-array. Assume that a reception beam for the target user of the kth radio frequency chain has been determined, denoted as $w_k$, then the design criterion for the beamforming vector $f_{k,i}$ transmitted by the kth radio frequency chain via the i-th sub-array is such that the gain of the equivalent channel $h_{k,i}^{eq}=w_k^T H_{k,i} f_{k,i}$ is maximum (where $w_k^T$ represents the transpose of $w_k$), and can be selected from a predetermined codebook by a variety of beamforming training algorithms. K beamforming vectors (corresponding to K sub-arrays respectively) shall be determined for each of the radio frequency chains, and the training for each sub-array can be performed by using the communication configuration process shown in FIG. 8.

For example, the first communication configuration parameter and the second communication configuration parameter obtained in steps 804 and 808 are respectively a beamforming vector of a corresponding sub-array of each radio frequency chain and a beamforming vector of each sub-array of each radio frequency chain other than the corresponding sub-array. The specific implementation process may be: in the first communication, the base station configures the phase shifting network so that the radio frequency chain k transmits the orthogonal training sequence only via the kth sub-array (as shown in steps 801-802). The corresponding user equipment measures the equivalent channel quality based on the received orthogonal training sequence (as shown in step 803), and feeds back the equivalent channel quality measurement result to the base station, to determine the beamforming vector $f_{k,k}$, $1 \leq k \leq K$ of the radio frequency chain k via the corresponding sub-array k (as shown in step 804). In the second communication, the base station configures the phase-shifting network so that the radio-frequency link k transmits the orthogonal training sequence via the k−1th sub-array (the first radio frequency chain sequentially transmits via at most K−1 sub-arrays) (step 805~806). Similarly, the corresponding user equipment measures the equivalent channel quality (as shown in step 807) and feeds back the equivalent channel quality measurement result to the base station, to determine the beamforming vector of the radio frequency chain k via the k−1th sub-array. $f_{k,k-1}$, $2 \leq k \leq K$, and $f_{1,K}$ (as shown in step 808). And so on, all beamforming vectors can be trained through the first communication and K−1 second communication.

As mentioned above, a simplified beam training method can be performed, in which, in the first communication, a beamforming vector $f_{k,k}$, $1 \leq k \leq K$ transmitted by the radio frequency chain k via the kth sub-array is obtained, then the determined beamforming vector is directly used as a vector used in the subsequent second stage of processing, without performing the second communication operation. That is, in the second stage of processing, in addition to the communication performed by the radio frequency chain via the corresponding sub-array, the beam transmitted by the radio frequency chain via other sub-arrays is also set to be the same as the transmission beamforming vector of the radio frequency chain in the first communication, i.e., $f_{k,i}=f_{k,k}$, $i \neq k$. In this way, the operation in the second stage will be simplified.

Figure 10B:
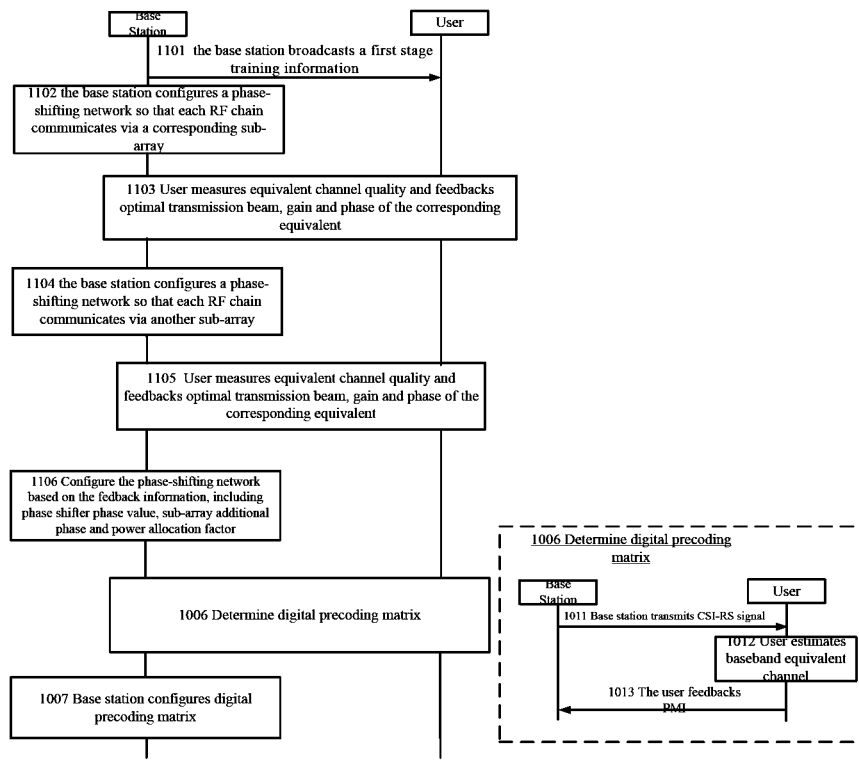
Figure 11A:
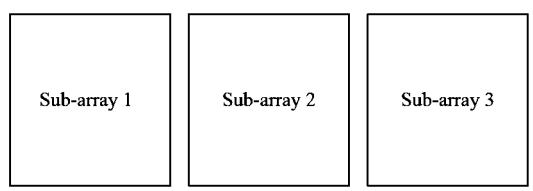
FIG. 11a shows a schematic diagram in which a number of subarrays are in the same plane.

It should be noted that the above description in conjunction with FIGS. 8 through 10 is mainly directed to a case where respective antenna sub-arrays are on the same plane, as shown in FIG. 11*a*. At this time, the radio frequency chain can perform the first communication with respect to its corresponding sub-array and perform the second communication with respect to other sub-arrays, respectively, without specifically selecting a primary sub-array for the radio frequency chain.

Figure 11B:
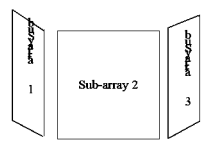
FIG. 11b shows a schematic diagram in which a number of sub-arrays are not in the same plane.

In another implementation, multiple antenna sub-arrays may be not on the same plane. FIG. 11*b* illustrates an exemplary case where a plurality of antenna sub-arrays are not in the same plane, wherein two sub-arrays are tilted relative to the center sub-array. It should be noted that there may be other forms for the case where multiple antenna sub-arrays are not on the same plane, for example, a plurality of curved arrays may be combined into a cylindrical form, a plurality of curved arrays may be combined into a spherical form, and the like.

When multiple antenna sub-arrays are not on the same plane, a primary sub-array needs to be selected for each radio frequency chain. In such a case, for each radio frequency chain, the first communication and the K−1 second communication described above may be employed to select the primary sub-array. It should be noted that in such a case, the simplified beam training method described above cannot be applied, mainly because the primary sub-array is usually determined after all communications have been performed, while he transmission beam configuration parameters of the radio frequency chain for each sub-array has been determined in the process. However, beamforming training in a non-coplanar antenna sub-array as described above can achieve more spatial diversity gain.

In accordance with an embodiment, in the communication with the first communication apparatus, the second communication apparatus performs reception by means of an initial set of reception configuration parameters or a particular set of reception configuration parameters, wherein the reception configuration parameters of the second communication apparatus are parameters related to directivity when the antenna at the receiver receives a signal. The particular set of reception configuration parameters is a set of reception configuration parameters in the plurality of sets of reception configuration parameters of the receiver that optimizes the communication channel quality with the transmitter. The particular set of reception configuration parameters is determined in such a manner that in a case of the first communication apparatus employing each of a plurality of sets of communication configuration parameters to configure the communication from the first communication apparatus to the second communication apparatus, and the second communication apparatus employing each of a plurality of sets of reception configuration parameters to sequentially receive the communications, a set of reception configuration parameters that optimizes the communication channel quality is selected as the particular set of reception configuration parameters.

In a second stage, i.e., step 1004, additional phases and power allocation factors for multiple sub-arrays of each radio frequency chain are determined.

The phase shifter phase and amplification factor for the radio frequency chain connecting to each sub-array are determined by estimating the equivalent channel $h_{k,i}^{eq}=w_k^T H_{k,i} f_{k,i}$. Similarly, the equivalent channel estimation can be performed using the communication configuration process shown in FIG. 8. At this time, the first communication configuration parameter and the second communication configuration parameter obtained by steps 804 and 808 are respectively an additional phase and power allocation factor for the corresponding sub-array of each radio frequency chain as well as an additional phase and power allocation factor for each subarray of each radio frequency chain other than the corresponding sub-array.

The specific implementation process may be: in the first communication, the base station configures the phase shifting network such that the radio frequency chain k performs transmission only via the kth sub-array (as in step 801), and each radio frequency chain transmits an orthogonal training sequence by using the foregoing determined transmission beamforming vector (as in step 802), the user estimates the equivalent channel coefficient (as in step 803) and feeds it back to the base station to determine additional phase and power allocation factor for the radio frequency chain k via the corresponding sub-array k (step 804). In the second communication, the base station configures the phase shifting network such that the radio frequency chain k performs transmission only via the k−1th sub-array (the first radio frequency chain performs transmission via the Kth sub-array) (as in step 805), and each radio frequency chain transmits an orthogonal training sequence by using the foregoing determined transmission beamforming vector (as in step 806), and the user estimates the equivalent channel coefficient (as in step 807) and feeds it back to the base station to determine additional phase and power allocation factor for the radio frequency chain k via the sub-array k−1 (step 808). And so on, after the first communication and up to K−1 second communication, all equivalent channel coefficients $h_{k,i}^{eq}$ can be obtained. The additional phase $\theta_{k,i}^{eq}$ for the kth RF chain connecting to the i-th sub-array is set to the conjugate of the phase of the equivalent channel coefficient $h_{k,i}^{eq}$, i.e., $e^{j\theta_{k,i}} = e^{-j angle(h_{k,i}^{eq})}$. The power allocation factor $\alpha_{k,i}$ is proportional to the equivalent channel gain, and the total power of each RF chain is normalized, so $$\alpha_{k,i} = \frac{|h_{k,i}^{eq}|}{\sqrt{\sum_{j=1}^{K} |h_{k,i}^{eq}|^2}}.$$

It should be noted that in step 1004, it may not be necessary to determine the power allocation factor.

After determining the beamforming vector $f_{k,i}$, $1 \le i \le K$, the additional phase $\theta_{k,i}$, and the power allocation factor $\alpha_{k,i}$ for the kth radio frequency chain via each sub-array, the transmission beamforming vector of the kth radio frequency chain can be expressed as:

$$f_k = \left[ \frac{|h_{k,1}^{eq}|}{\sqrt{\sum_{i=1}^{K} |h_{k,i}^{eq}|^2}} e^{j\theta}_{k,1} f_{k,1}, \ldots , \frac{|h_{k,K}^{eq}|}{\sqrt{\sum_{i=1}^{K} |h_{k,i}^{eq}|^2}} e^{j\theta}_{k,K} f_{k,K} \right]^T$$

In the absence of power allocation, the transmission beamforming vector of the kth radio frequency chain can be expressed as:

$$f_k = \left[ \frac{1}{\sqrt{K}} e^{j\theta}_{k,1} f_{k,1}, \ldots , \frac{1}{\sqrt{K}} e^{j\theta}_{k,K} f_{k,K} \right]^T$$

In an implementation, before step 1002, the base station may optionally perform step 1001 to broadcast each user equipment a first stage training information, for example, a training sequence indication information for the user equipment, start time and the end time of beamforming training (for example, the subframe number), the number of times the training sequence is sent, and the like.

After determining beamforming vectors for a plurality of sub-arrays of each radio frequency chain in step 1002, in step 1003, the base station may optionally configure the phase values of the phase-shifting network based on the determined beam-forming vectors, to carry out the operation in step 1004.

After determining additional phases and power allocation factors for the plurality of sub-arrays of each radio frequency chain in step 1004, the base station can configure values of the phase shifters and power amplifiers between each radio frequency chain and the plurality of sub-arrays based on the determined additional phases and power allocation factors in step 1005.

In a third stage, i.e., step 1006, the base station determines a digital precoding matrix based on the result of the baseband equivalent channel estimation. The specific implementation process may be, for example, as shown in the dotted line frame: in step 1011, the base station transmits a reference signal such as a channel state information reference signal (CSI-RS) to the user equipment; in step 1012, the user estimates a channel state information based on the received reference signal. In step 1013, each user feeds back the channel state information such as a Precoding Matrix Indicator (PMI), a Channel Quality Indicator (CQI), and the like to the base station.

In step 1007, the base station performs digital precoding using the channel state information fed back by each user to multiplex transmission resources while controlling interference between users or determining a modulation coding scheme or the like for user scheduling. The digital precoding design can use a zero-forcing algorithm, i.e.

$$B = H_{eq}^H (H_{eq} H_{eq}^H)^{-1} \Lambda$$

Where $[H_{eq}]_{i,j} = w_i^T H_{i,j} f_j$, $H_{i,j}$ represents a channel matrix between the jth radio frequency chain and the ith user, $\Lambda$ represents a diagonal matrix for transmission power allocation between users.

Note that the power allocation factor may be an indication of a quantized form, similar to CQI, and the additional phase may be an index value of a codeword selected from a dedicated protocol codebook, similar to PMI, thereby reducing feedback overhead. It is to be understood that the power allocation factor and the additional phase as weight coefficients for respective sub-arrays have different functionalities from the CQI and PMI. The weight coefficients are for setting the analog beam and for sub-array weighting, and CQI and PMI are for a process, such as, resource scheduling, baseband digital precoding, etc. after the analog beam is set.

The precoding process shown in FIG. 10a will be described below by taking the specific architecture corresponding to FIG. 9c as an example. A greatly simplified process can be implemented in the precoding operation in conjunction with the specific architecture shown in FIG. 9c.

Specifically, in the first stage. i.e., step 1002, in the first communication, the beamforming vector $f_{k,k}$, $1 \le k \le K$ transmitted by the radio frequency chain k via the kth sub-array is obtained, and then directly used as a vector used in the subsequent second stage of processing without performing a second communication operation. That is, in the second stage of processing, in addition to the radio frequency chain performing communication via the corresponding sub-array, beams transmitted by the radio frequency chain via other sub-arrays are also fixed to the beamforming vector determined in the first communication corresponding to the other sub-arrays. In this way, the operation in the first stage will be simplified. The operation in step 1003 can be performed as mentioned above, and will be not described in detail.

In a second phase, i.e., step 1004, additional phases and power allocation factors for multiple sub-arrays of each radio frequency chain are determined. The phase shifter phase and amplification factor for the RF chain connecting to each sub-array are determined by estimating the equivalent channel $h_{k,i}^{eq} = w_k^T H_{k,i} f_{k,i}$. Similarly, the equivalent channel estimation can be performed by using the communication configuration process shown in FIG. 8. Meanwhile, the first communication configuration parameter and the second communication configuration parameter obtained by steps 804 and 808 are respectively the additional phase and power allocation factor of a corresponding sub-array of each radio frequency chain, as well as additional phase and power allocation factor of each subarray of each radio frequency chain other than the corresponding sub-array.

Thereby, the transmission beamforming vector of the radio frequency chain similar to the foregoing can be determined.

Subsequent processing of the third stage will proceed as described above with respect to step 1006 and will not be described in detail herein. The operation in the step 1007 will proceed as described above and will not be described in detail herein.

It should be noted that the precoding process illustrated in FIG. 10a is merely exemplary, and the precoding process of the present disclosure may also be performed in other manners.

In one implementation, the first stage and the second phase of the precoding process described above may be combined into one stage, that is, the transmission beamforming vector, the additional phase, and the power allocation factor in the communication can be determined together, not individually. In this case, its operation can be performed using the communication configuration process shown in FIG. 8. Meanwhile, At this time, the first communication configuration parameter and the second communication configuration parameter obtained by steps 804 and 808 are respectively the transmission beamforming vector, the additional phase and power allocation factor of a corresponding sub-array of each radio frequency chain, and the transmission beamforming vector, additional phase and power allocation factor of each subarray of each radio frequency chain other than the corresponding sub-array. This exemplary implementation is shown in FIG. 10b.

In the precoding process shown in FIG. 10b, an optimal beamforming vector, a sub-array additional phase, and the like when the radio frequency chain performs communication via the corresponding sub-array is determined by 1102 and 1103. Then, the optimal beamforming vector, the sub-array additional phase, and the like when the radio frequency chain performs communication via the remaining sub-arrays is determined by 1104, 1105. Thus, in 1106, a phase shifting network can be configured, including phase shifter phase values, sub-array additional phases, and the like. Subsequent operations of 1006 and 1007 can be performed as previously described in connection with FIG. 10a, and the description will not be repeated here.

Similarly, in the precoding operation shown in FIG. 10b, a simplified form of operation can still be performed. For example, in the operations of 1102 and 1103, the beamforming vector $f_{k,k}$, $1 \leq k \leq K$ transmitted by the radio frequency chain k via the kth sub-array is obtained, and then the determined beamforming vector is directly used as a vector used in the subsequent processing of 1104 and 1105, without determining a beamforming vector again. That is, in the processing of 1104 and 1105, the beamforming vector transmitted by the radio frequency chain through other sub-arrays is set as the transmission beamforming vector of the radio frequency chain in the first communication, that is, $f_{k,i}=f_{k,k}$, $i \neq k$.

Furthermore, another simplified form of processing can be performed in conjunction with the architecture shown in FIG. 9c. Wherein, in the processing of 1104 and 1105, the beamforming vectors transmitted by the radio frequency chain via other sub-arrays are set as the transmission beamforming vector via the sub-array in the first communication, that is, $f_{k,i}=f_{i,i}$, $i \neq k$.

In the following, assuming that there are two radio frequency chains and two sub-arrays (assuming K=2), it is described that the data communication antenna configuration is determined by training in a hybrid connection architecture corresponding to the simplified form of FIG. 9c, in which case the configuration can be determined in only two rounds of training.

The first round: the radio frequency chain 1 transmits a training sequence to the user equipment 1 (UE1) only via the primary sub-array 1, and a transmission beam vector f1 and an equivalent channel $h_{1,1}^{eq}$ can be trained by scanning a codebook.

The radio frequency chain 2 transmits a training sequence to the user equipment 1 (UE2) only via the primary sub-array 2, and a transmission beam vector f2 and an equivalent channel $h_{2,2}^{eq}$ can be trained by scanning a codebook.

The second round: the radio frequency chain 1 transmits the training sequence to the UE1 only via the secondary sub-array 2, wherein the sub-array 2 fixedly uses the beam vector f2, and UE detects an equivalent channel $h_{1,2}^{eq}$ to the sub-array 2;

The radio frequency chain 2 transmits the training sequence to the UE 2 only via the secondary sub-array 1, wherein the sub-array 1 fixedly uses the beam vector f1, and UE 2 detects an equivalent channel $h_{2,1}^{eq}$ to the sub-array 1.

Next, the phase value of the additional phase shifter 1-1 of the radio frequency chain 1 is set to the conjugate $\theta_{1,1}$ of the phase of the equivalent channel $h_{1,1}^{eq}$, and the phase value of the additional phase shifter 1-2 is set to the conjugate $\theta_{1,2}$ of the phase of the equivalent channel $h_{1,2}^{eq}$; the phase value of the additional phase shifter 2-1 of the radio frequency chain 2 is set to the conjugate $\theta_{2,1}$ of the phase of the equivalent channel $h_{2,1}^{eq}$, the phase value of the additional phase shifter 2-2 is set to the conjugate $\theta_{2,2}$ of the phase of $h_{2,2}^{eq}$.

Thus, the transmission configuration of the radio frequency chain 1 is completed. The final transmission beamforming vector without power allocation can be expressed as:

$$f_1 = \left[ \frac{1}{\sqrt{2}} e^{j\theta}_{1,1} f_1, \frac{1}{\sqrt{2}} e^{j\theta}_{1,2} f_2 \right]^T$$

The transmission configuration of the radio frequency chain 2 is completed, and the final transmission beamforming vector without power allocation can be expressed as:

$$f_2 = \left[ \frac{1}{\sqrt{2}} e^{j\theta}_{2,1} f_1, \frac{1}{\sqrt{2}} e^{j\theta}_{2,2} f_2 \right]^T$$

Two-Layer Phase Shifting Network Based on Sub-Array

In another embodiment, the present application also proposes a two-layer phase shifting network design for a two-dimensional planar array antenna. In principle, a first direction phase shifter and a second direction phase shifter may be arranged between antennas in the two-dimensional planar array antenna of the communication system and radio frequency chains, wherein each antenna is connected to the first direction phase shifter, a set of first direction phase shifters connected to each row or column of antennas are connected to a second direction phase shifter, and a constituted set of second direction phase shifters are connected to the radio frequency chains. The electronic equipment includes a processing circuitry configured to: configure configuration parameters (eg, phase) of each of the set of second directional phase shifters, and configure configuration parameters (eg, phase) of each of respective sets of first direction phase shifters.

A two-layer phase shifting network of a two-dimensional planar antenna array is described below in conjunction with FIGS. 12*a*, 12*b* and 13.

Considering a two-dimensional planar antenna array of W×H size, where W is the number of horizontal antennas, H is the number of vertical antennas, and the index of the antenna unit on the xth row and yth columns can be expressed as k=x·W+y. Let $\theta_k$ denote the phase shifting value on the antenna unit, i.e. $[f]_k = e^{j\theta_k}$, where f is the beamforming vector. Due to a Kronecker product property of the beamforming vector of the two-dimensional planar antenna array, i.e., $f = f_h \otimes f_v$, where $f_h$ is a horizontal beamforming vector and $f_v$ is a vertical beamforming vector, the following can be obtained:

$$[f]_k = [f_h]_y [f_v]_x = e^{j\theta_{h,y}} e^{j\theta_{v,x}} = e^{j\theta_k}$$

Therefore, the phase shifting phase $\theta_k$ on the kth antenna element can be obtained by a horizontal phase shift phase $\theta_{h,y}$ and a vertical phase shift phase $\theta_{v,x}$, that is, the analog beamforming can be implemented by a two-layer phase shifting network including a horizontal layer and a vertical layer.

Figure 12A:
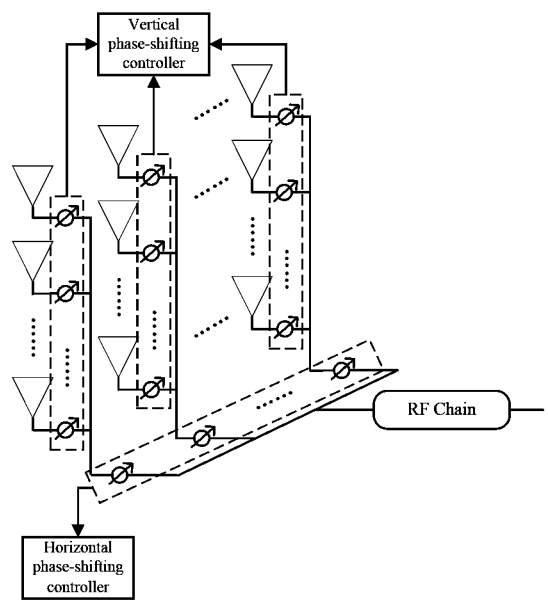
FIG. 12a shows a schematic diagram of a two-layer phase shifting network design employing a vertical priority structure.
Figure 12B:
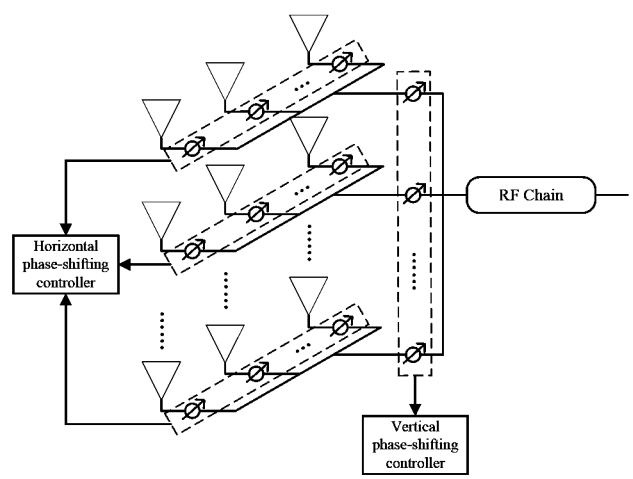
FIG. 12b shows a schematic diagram of a two-layer phase shift network design using a horizontal priority structure.
Figure 13:
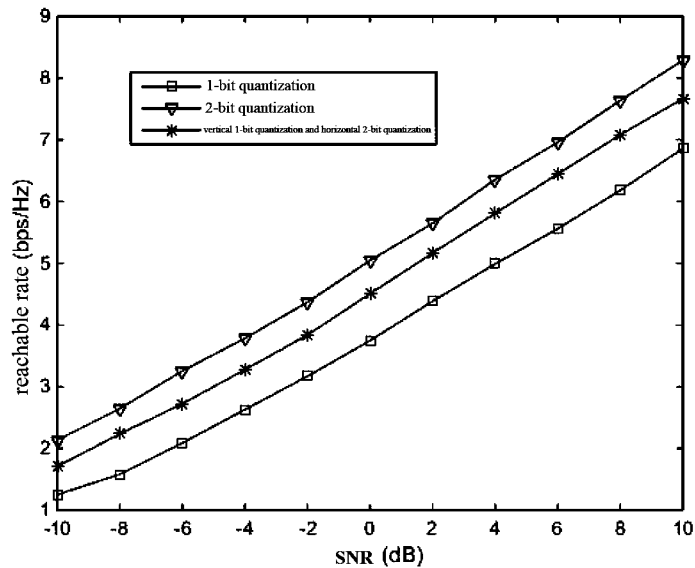
FIG. 13 shows a performance comparison of the proposed vertical priority structure to a legacy architecture.

According to the order of the horizontal phase shifting layer and the vertical phase shifting layer, two kinds of phase shifting network architectures, that is, a vertical priority structure and a horizontal priority structure, are proposed, as shown in FIGS. 12*a* and 12*b*. Taking the vertical priority structure as an example, each antenna unit is first connected to a vertical phase shifter, so the number of vertical phase shifters is equal to the number of antennas, that is, WH. Then, each column of vertical phase shifters is connected to a horizontal phase shifter, so the number of horizontal phase shifters is equal to the number of horizontal antennas, that is, W. Finally, all horizontal phase shifters are connected to a RF chain. Due to the Kronecker product structure of the beamforming vector, phase values of the vertical phase shifters constitute a vertical beamforming vector, and respective columns should be identical, and phase values of the horizontal phase shifters constitute a horizontal beamforming vector. When the phase shifting network is configured to perform transmission using a beam $f = f_h \otimes f_v$, the kth element phase value $[f]_k = e^{j\theta_k}$ of f can be expressed as a product of a horizontal phase value $[f_h]_y = e^{j\theta_{h,y}}$ and a vertical phase value $[f_v]_x = e^{j\theta_{v,x}}$, where k=x·W+y, then, the phase shift value of the yth horizontal phase shifter should be configured as $e^{j\theta_{h,y}}$, and the phase shift value of the xth vertical phase shifter of each column of vertical phase shifters should be configured as $e^{j\theta_{v,x}}$.

The proposed two-layer phase-shifting network design has the following advantages:

(1) The horizontal beam and the vertical beam can be independently controlled and adjusted. In this architecture, the horizontal phase shifters and vertical phase shifters are configured by means of independent controllers and thus can be adjusted independently. Therefore, in the beam training process, the vertical beam and/or the horizontal beam can also be scanned independently.

(2) Reduce the complexity of the phase shifting network controller. The complexity of the phase shifting network controller is determined by the size of the supported codebook. In the traditional architecture, the codebook size is O(WH), and in the proposed two-layer phase-shifting network design, the sizes of the horizontal codebook and the vertical codebook are O(W) and O(H), respectively.

(3) Low-precision phase shifters can be used. In an actual system, a phase shift value of a phase shifter is quantized, for example, the phase-shifting phases supported by a 2-bit quantized phase shifter is $\{0, \pi/2, \pi, -\pi/2\}$. The cost and power consumption of the phase shifter increase rapidly with increasement of quantization precision, so the usage of low-precision phase shifters, such as 1-bit quantized phase shifters, can greatly reduce hardware complexity. In the conventional architecture, 2-bit quantized phase shifters are usually used to ensure performance, and the number of 2-bit quantized phase shifters required is WH. However, if 1-bit quantized phase shifters are used, a serious performance loss will be caused. In the proposed two-layer phase shifting network architecture, the horizontal phase shifting layer and the vertical phase shifting layer can use phase shifters with different precisions. For example, in the vertical priority structure, 1-bit phase shifters are used as vertical phase shifters, and 2-bit phase shifters are used as horizontal phase shifters, and W 2-bit phase shifters and WH 1-bit phase shifters are required in total, and the hardware complexity is greatly reduced.

In order to further illustrate the present disclosure, a more specific embodiment is given below.

Consider a single-user millimeter-wave large-scale antenna system. The base station is equipped with a UPA antenna array, and the number of antennas is M=W×H, where W=16 is the number of antennas in the width direction of the antenna array, and H=4 is the number of antennas in the height direction of the antenna array. The user is equipped with an NLA array of N=4. FIG. 13 shows the performance comparison between the proposed vertical-priority architecture and a traditional architecture, wherein the vertical-priority architecture uses 1-bit quantized vertical phase shifters and 2-bit quantized horizontal phase shifters, and the traditional architecture uses 2-bit quantized shift phasers and 1-bit quantized phase shifters respectively. Compared to the traditional architecture using 2-bit quantized phase shifters, the proposed vertical-priority architecture significantly reduces hardware complexity; compared to the traditional architecture using 1-bit quantized phase shifters, the proposed vertical-priority architecture greatly improves the average reachable rate of the system.

The two-layer phase-shifting network design shown in FIGS. 12*a* and 12*b* shows only a single RF chain. It should be understood that the proposed two-layer phase shifting network design can also be extended to a multiple radio-frequency chain system.

In view of the above knowledge of the two-layer phase shifting network, the applicant further proposes an improved sub-array-based two-layer phase shifting network.

According to an embodiment, an electronic equipment for a first communication apparatus of a wireless communication system is proposed, comprising: a number of antenna sub-arrays, each sub-array being a planar antenna array, each column or row in the sub-array corresponding to one input terminal; a plurality of sets of first direction phase shifters, wherein the first direction phase shifters in each set are disposed between input terminals of the corresponding sub-arrays and a radio frequency chain, wherein each set of the plurality of sets of first direction phase shifters is configured to adjust a first configuration parameter, such as a first direction angle, of an antenna beam for transmitting a corresponding radio frequency chain signal in a first direction in accordance with a first control signal.

Thus, such an electronic equipment can advantageously implement RF chain-specific first direction antenna beam adjustment.

Preferably, each sub-array can be configured to transmit antenna beams in a second direction with different second configuration parameters (eg, a second direction angle), the first direction and the second direction being orthogonal to each other.

Preferably, each antenna in the sub-array may be connected to a second direction phase shifter, and the second direction phase shifter may be configured to adjust the second direction angle of the antenna beam in the second direction according to the second control signal.

Preferably, the precision of the second direction phase shifter may be lower than that of the first direction phase shifter.

Preferably, each set of first direction phase shifters may be connected to only one sub-array, each set of first direction phase shifters comprising at least the same number of phase shifters as the input terminals of the corresponding sub-array.

Preferably, each set of first direction phase shifters is connectable to the number of sub-arrays, each set of first direction phase shifters comprising at least the same number of phase shifters as the total input terminals of the number of sub-arrays.

Thereby, it can be advantageous for a plurality of radio frequency chains sharing the number of sub-arrays, thereby simplifying the connection while supporting one radio frequency chain to enjoy spatial gains of a plurality of sub-arrays.

In a specific implementation, for example, each radio frequency chain can be connected to multiple sub-arrays via a set of first direction phase shifters, and a switch/selector can be disposed on the connection to each sub-array to assist in only using one sub-array in the training process.

Preferably, the electronic equipment can be implemented as a base station, and further includes a processing circuitry configured to sequentially generate a second control signal and a first control signal for a beam training stage, and configure a second direction phase shifter to sweep multiple second direction angles to transmit second direction training beams, and then configures the first direction phase shifter to sweep multiple first direction angles to transmit first direction training beams.

Preferably, the processing circuit is further configured to generate the first control signal and the second control signal for the data communication stage based on the beam training feedback from a second communication apparatus corresponding to each radio frequency chain, and respectively configure the first direction phase shifter and the second direction phase shifter to thereby transmit communication beams at a specific first direction angle and a specific second direction angle.

Preferably, each column in the sub-array may correspond to one input terminal, the first direction corresponding to a horizontal direction and the second direction corresponding to a vertical direction.

In a specific implementation, the first direction phase shifter and the second direction phase shifter may be electronic phase shifters or mechanical phase shifters. Accordingly, configuring direction angles at which respective sub-array transmit antenna beams may include an electrically tunnable configuring and a mechanical configuring. The electrically tunnable configuring may be, for example, utilizing the method of training beamforming vectors in step 1002 of FIG. 10a to determine transmission beams of sub-arrays in the first direction or the second direction. The electrically tunnable configuring may also divide the azimuth angle of the first direction or the second direction into a plurality of angles, each sub-array being configured as corresponding to an angle. This division can be variable, semi-static depending on the manner of electric phase shifter. For example, the azimuth angle of the first direction or the second direction is initially divided uniformly, and then the azimuth angle of the first direction or the second direction in which users are concentratedly distributed is divided. In the case of a mechanical configuring, the operator can set direction angles of different sub-arrays in the first direction or the second direction to be different when laying the network. The mechanical configuration is also adjustable, but requires manual adjustment.

Figure 14:
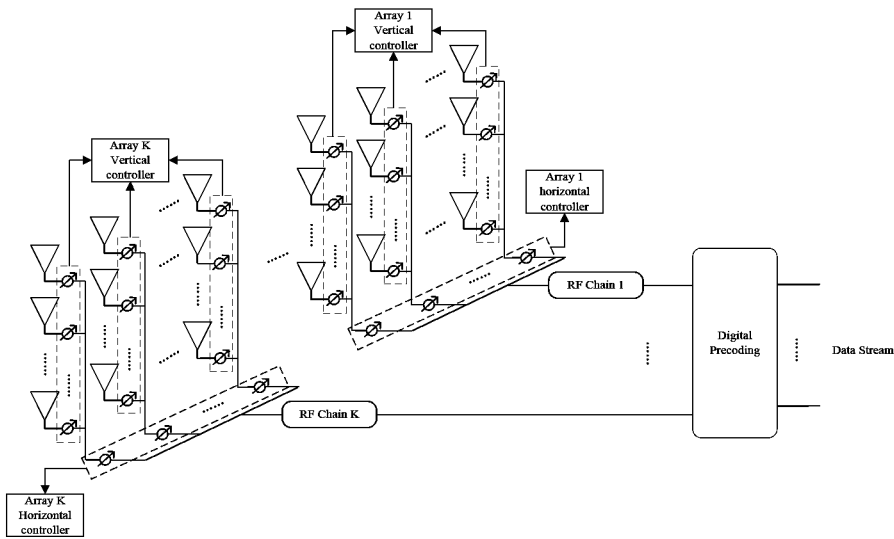

FIG. 14 illustrates an exemplary hybrid connection architecture for a multi-user wireless communication system employing a two-layer phase shifting network design. The system includes K antenna sub-arrays, each sub-array uses two layers of phase shifters, a phase of a vertical phase shifter is controlled by a vertical controller, and a phase of a horizontal phase shifter is controlled by a horizontal controller. The hybrid connection architecture differs from the hybrid connection architecture employing a sub-connection phase-shifting network in that for an antenna sub-array to which each radio-frequency chain is connected, the phase-shifting network consists of a vertical layer and a horizontal layer.

According to an embodiment, a method for a first communication apparatus of a wireless communication system is further proposed, the first communication apparatus comprising a number of antenna sub-arrays, each sub-array being a planar antenna array, each column or row in a sub-array corresponding to one input terminal; and a plurality of sets of first direction phase shifters, the first direction phase shifters in each set being disposed between input terminals of respective sub-arrays and a radio frequency chain, the method comprising adjusting a first direction angle of an antenna beam for transmitting a corresponding radio frequency chain signal in a first direction by means of each set of the plurality of sets of first direction phase shifters according to the first control signal.

By means of the above improved two-layer phase shifting network design based on antenna sub-arrays, a first-direction antenna beam adjustment specific to a radio frequency chain can be realized.

It should note that in the design of a two-layer phase shifting network scenario, communication configuration parameters of a second communication apparatus in communication with a first communication apparatus can also be set as described above. For example, the second communication apparatus performs reception with an initial set of reception configuration parameters or a specific set of reception configuration parameters, such that the reception configuration parameters can be determined while the first communication apparatus determines configuration parameters in the first direction and configuration parameters in the second direction. The specific set of reception configuration parameters is a set of reception configuration parameters in a plurality of sets of reception configuration parameters of a receiver that optimize communication channel quality with a transmitter. Preferably, the communication configuration parameters of the second communication apparatus may also be divided into sub-configuration parameters in two directions corresponding to the first direction parameter and the second direction parameter of the first communication apparatus, and in a first direction related communication and a second direction related communication, the sub-reception configuration parameters of corresponding directions are determined respectively, thereby combining the determined sub-reception configuration parameters of the two directions to obtain the final reception configuration parameters.

Sub-Array-Based Hybrid Precoding+Two-Layer Phase Shifting Network

The present application also proposes an improved sub-array-based hybrid connection hybrid precoding architecture, in which a two-layer phase shifting network of antenna sub-arrays is further considered.

As described in detail above, the hybrid-connection hybrid precoding architecture includes multiple radio frequency chains and the same number of antenna sub-arrays (set to K), each sub-array can be connected to multiple radio frequency chains, and a phase shifter and an optional RF power amplifier can be provided between each sub-array and each the RF chain. On this basis, each RF chain can be connected to each antenna sub-array via a two-layer phase shifting network.

In the hybrid connection hybrid precoding architecture, the electronic equipment of the first communication apparatus can still perform the first communication and the second communication to determine the first communication configuration parameter and the second communication configuration parameter, similar to the communication flow as shown in FIG. 8. It should be noted, however, that in the determination of each communication configuration parameter, sub-communication configuration parameters corresponding to each layer of the two-layer phase-shifting network should be considered, respectively.

According to an embodiment, an operation may be performed in each of the first communication and the second communication by performing communication via a sub-array such that the first sub-communication configuration parameter is determined, wherein the first sub-communication configuration parameter is associated with a first direction relative to a plane of the sub-array; and performing communication via the sub-array based on the determined first sub-communication configuration parameter, such that a second sub-communication configuration parameter is determined, wherein the second sub-communication configuration parameter is associated with a second direction relative to the plane, the second direction being orthogonal to the first direction. Thus, the first communication configuration parameter is obtained by combining the first sub-communication configuration parameter and the second sub-communication configuration parameter in the first communication, and the second communication configuration parameter is obtained by combining the first sub-communication configuration parameter and the second sub-communication configuration parameter in the second communication.

In some embodiments, the first direction is a horizontal direction relative to a plane of the antenna array, and the second direction is a vertical direction relative to a plane of the antenna array. In still other embodiments, the first direction is a vertical direction and the second direction is a horizontal direction.

In a particular implementation, a non-simplified beamforming training may be performed for both the first communication and the second communication as discussed above in connection with FIG. 8, for example, orthogonal training sequences are transmitted for the first communication and the second communication, respectively, to perform training, and in each of the first communication and the second communication, orthogonal training sequences are separately transmitted for training the first sub-configuration parameter and the second sub-configuration parameter, thereby obtaining a more accurate and appropriate communication configuration parameter.

According to an embodiment, a simplified beamforming training may also be employed to determine a communication configuration parameter.

Preferably, in the second communication, the second communication is performed by using a beamforming vector included in the first sub-communication configuration parameter, such that a third sub-configuration parameter is determined. Preferably, in the second communication, the second communication is performed by using a beamforming vector included in the first sub-communication configuration parameter and a beamforming vector included in the second sub-communication configuration parameter, so that the third sub-configuration parameter is determined.

Thus, the first communication configuration parameter includes the first sub-communication configuration parameter associated with a first direction relative to a plane of the plurality of antennas and a second sub-communication configuration parameter associated with a second direction relative to the plane of the plurality of antennas, the first direction and the second direction being orthogonal to each other; and the second communication configuration parameter includes the first sub-communication configuration parameter and the third sub-communication configuration parameter associated with a second direction relative to the plane of the plurality of antennas.

It should be noted that the sub-communication configuration parameters described above have similar meanings with the communication configuration parameters mentioned in the full text. For example, the sub-communication configuration parameters may also be a weight parameter for a corresponding sub-array. The weight parameter can be a phase/additional phase, meanwhile the equivalent channel quality measurement result is the phase of the equivalent channel. The weight parameter can also be a power allocation factor for the corresponding sub-array, meanwhile the equivalent channel estimation result is the gain of the equivalent channel. Moreover, as mentioned above, the power allocation factor is not necessary.

According to an embodiment, a first direction phase shifter and a second direction phase shifter are disposed between a radio frequency chain and a sub-array. The first direction phase shifter and the second direction phase shifter between the radio frequency chain and the corresponding sub-array are respectively set by the first sub-communication configuration parameter and the second sub-communication configuration parameter in the first communication. The first direction phase shifters and the second direction phase shifters between the radio frequency chain and the remaining sub-arrays are respectively set by the first sub-communication configuration parameter and the second sub-communication configuration parameter in the second communication.

According to an embodiment, corresponding to the simplified beamforming scheme as described above, the first direction phase shifter and the second direction phase shifter between the radio frequency chain and the corresponding sub-array are respectively configured by the first direction sub-communication configuration parameter and the second direction sub-communication configuration parameter. The first direction phase shifters and the second direction phase shifters between the radio frequency chain and the remaining sub-array are respectively configured by the first direction sub-communication configuration parameter and the third direction sub-communication configuration for the remaining sub-arrays.

In this embodiment, a communication configuration parameter of a second communication apparatus in communication with the first communication apparatus can also be set as described above. For example, the second communication apparatus performs reception with an initial set of reception configuration parameters or a specific set of reception configuration parameters, such that the reception configuration parameter is determined while the first communication apparatus determines a configuration parameter in the first direction and a configuration parameter in the second direction. The specific set of reception configuration parameters is a set of reception configuration parameters in a plurality of sets of reception configuration parameters of a receiver that optimize communication channel quality with a transmitter. Preferably, a communication configuration parameter of the second communication apparatus may also be divided into sub-configuration parameters in two directions corresponding to the first direction parameter and the second direction parameter of the first communication apparatus, and in the first direction related communication and the second direction related communication, sub-reception configuration parameters in the corresponding directions are respectively determined, thereby combining the determined sub-reception configuration parameters in the two directions to obtain the final reception configuration parameters.

According to some embodiments, the first direction is a horizontal direction and the second direction is a vertical direction. Each antenna in a sub-array is connected to a horizontal phase shifter, and each row of horizontal phase shifters are connected to a vertical phase shifter, and a constituted column of vertical phase shifters are connected to a RF chain, and one column of vertical phase shifters of each sub-array have the same phase value.

According to further embodiments, the first direction is a vertical direction and the second direction is a horizontal direction. Each antenna in the sub-array is connected to a vertical phase shifter, and each column of vertical phase shifters are connected to a horizontal phase shifter, and a constituted row of horizontal phase shifters are connected to the radio frequency chain, one row of horizontal phase shifters of each sub-array have the same phase values.

Specifically, the two-layer phase shifting network may adopt a vertical priority structure or a horizontal priority structure. If a vertical priority structure is used, the vertical phase shifting layer is shared by all radio frequency chains; if a horizontal priority structure is used, the horizontal phase shifting layer is shared by all radio frequency chains.

Figure 15A:
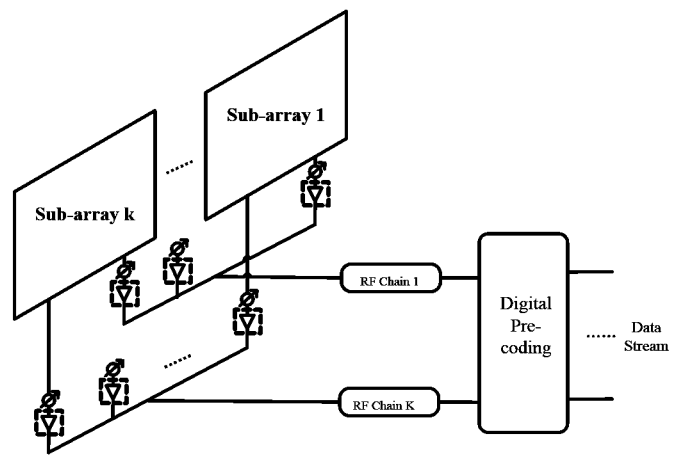
FIGS. 15a and 15b show schematic diagrams of a hybrid connection hybrid precoding architecture in a vertical priority structure and a two-layer phase shifting network for each subarray therein, respectively.
Figure 15B:
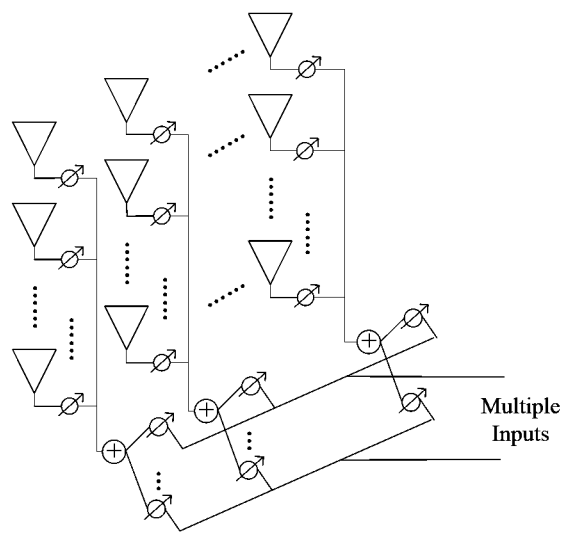

FIGS. 15a and 15b show schematic diagrams of a hybrid connection hybrid precoding architecture and a two-layer phase shifting network for each subarray therein in a vertical priority structure, respectively.

In the vertical priority structure, each column of vertical phase shifters of each sub-array shall have the same phase values, forming a vertical beamforming vector for the sub-array, and a vertical beam for the k-th sub-array is represented by $f_{v,k}$. In addition, a phase value of a horizontal phase shifter connecting a certain RF chain and the sub-array constitutes a horizontal beamforming vector transmitted by the RF chain using the sub-array, and $f_{h,k,j}$ is used to represent a horizontal beam transmitted by the kth RF chain via the jth sub-array. The corresponding beamforming vector transmitted by the kth radio frequency chain via the jth sub-array is $f_{k,j} = f_{h,k,j} \otimes f_{v,k}$. There also exists an additional phase $\theta_{k,j}$ when the kth RF chain is connected to the jth sub-array, which can be implemented by a horizontal phase shifter without additional hardware overhead. In addition, in the case of supporting power allocation, before the kth RF chain is connected to the jth sub-array, an additional RF power amplifier needs to be configured, and the normalized amplification factor is represented by $\alpha_{k,j}$.

The number of phase shifters required in a traditional full connection architecture is KWH, the number of phase shifters required for a sub-connection architecture is WH, and the number of phase shifters required for the proposed hybrid connection architecture is WH+KW. The complexity is greatly reduced compared to the full connection architecture.

Based on this hybrid connection architecture, various precoding processes can be designed.

Figure 16:
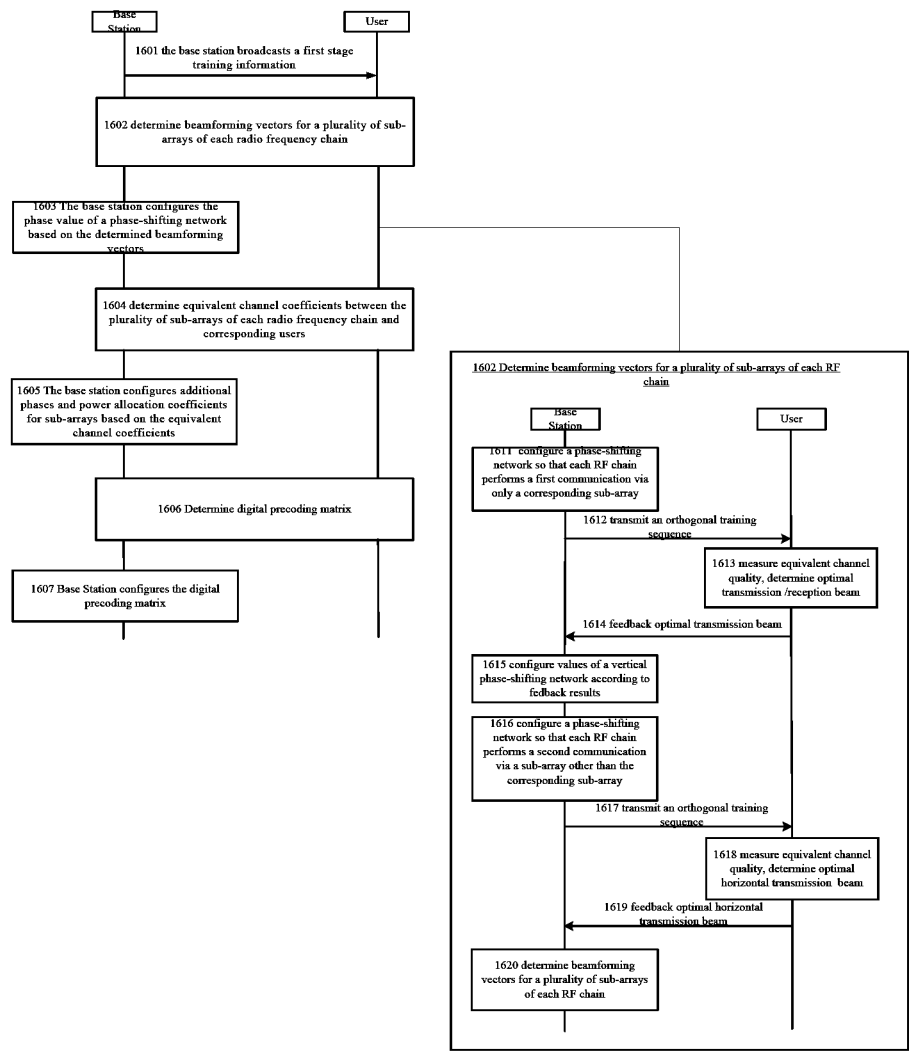
FIG. 16 shows an exemplary precoding design flow.

As an example, FIG. 16 illustrates an exemplary precoding design flow. Similar to FIG. 10a, the precoding design process also includes three stages: 1. Determining a beamforming vector for each subarray (step 1602); 2. Determining an additional phase of a phase shifter and a power allocation factor of a radio frequency power amplifier for a radio frequency chain connecting to each subarray (step 1604); 3. Determining a digital precoding matrix (step 1606). Besides the particular implementation process of step 1602 being somewhat different from that in FIG. 10a, the other steps 1601, 1603~1607 can be implemented completely with reference to the corresponding steps 1001, 1003~1007 in FIG. 10a, and the details are not described here. An exemplary implementation of the step 1602 of determining a beamforming vector for each sub-array is specifically described below, as shown by the dashed box in FIG. 16, wherein it is assumed that the system employs the vertical-priority hybrid connection architecture shown in FIGS. 15a and 15b.

Sub-array beam design is performed in steps 1611-1615. The base station is configured such that the kth radio frequency chain performs transmission only via the kth sub-array, and a beamforming training process is performed to configure a horizontal beamforming vector $f_{h,k,k}$ and a vertical beamforming vector $f_{v,k}$ ($1 \leq k \leq K$) for each radio frequency chain connecting to a corresponding sub-array, and a reception beamforming vector $w_k$ of a corresponding user. This step is identical to the beamforming training process in the traditional sub-connection architecture, and can employ existing beamforming training algorithms, such as exhaustive search, single feedback search, and the like. Each RF chain transmits an orthogonal training sequence during training to support simultaneous training. After the user estimates an optimal base station transmission beam between the user and the corresponding radio frequency chain, the index of the transmission beam is fed back.

The horizontal beam design is performed in steps 1616~1619. Specifically, K−1 training stages are included. In each training stage, the base station is configured such that the kth radio frequency chain performs transmission via only the jth, $1 \leq j \leq K$, $j \neq k$ sub-array, and the beamforming training process is carried out to configure a horizontal beamforming vector $f_{h,k,j}$, $k \neq j$ for each RF chain connecting to other sub-arrays. Each radio frequency chain transmits an orthogonal training sequence to sweep alternate horizontal transmission beams in a horizontal codebook. At each training stage, after the user estimates an optimal horizontal transmission beam between it and a corresponding radio frequency chain, the index of the horizontal transmission beam is fed back.

Those skilled in the art will recognize that the process for determining a beamforming vector for each sub-array performed in steps 1611 to 1619 is obtained by combining the multi-sub-array based communication configuration process shown in FIG. 8 and the two-layer phase shifting network design proposed by the present application.

Also, a simplified beamforming training method can be performed. Since optimal horizontal beams transmitted by the same radio frequency chain via different sub-arrays tend to be the same, $f_{h,k,j}$, k≠j can be directly set to $f_{h,k,k}$, thus steps 1616~1619 can be omitted.

In step 1620, based on the horizontal beamforming vector $f_{h,k,k}$ and the vertical beamforming vector $f_{v,k}$ (1≤k≤K) for a sub-array k corresponding to the kth radio frequency chain and the horizontal beamforming vector $f_{h,k,j}$, k≠j for another sub-array j, 1≤j≤K, j≠k obtained in steps 1611 to 1619, it can be determined that a corresponding beamforming vector transmitted by the radio frequency chain k via the j-th sub-array is $f_{k,j} = f_{h,k,j} \otimes f_{v,k}$.

Figure 17:
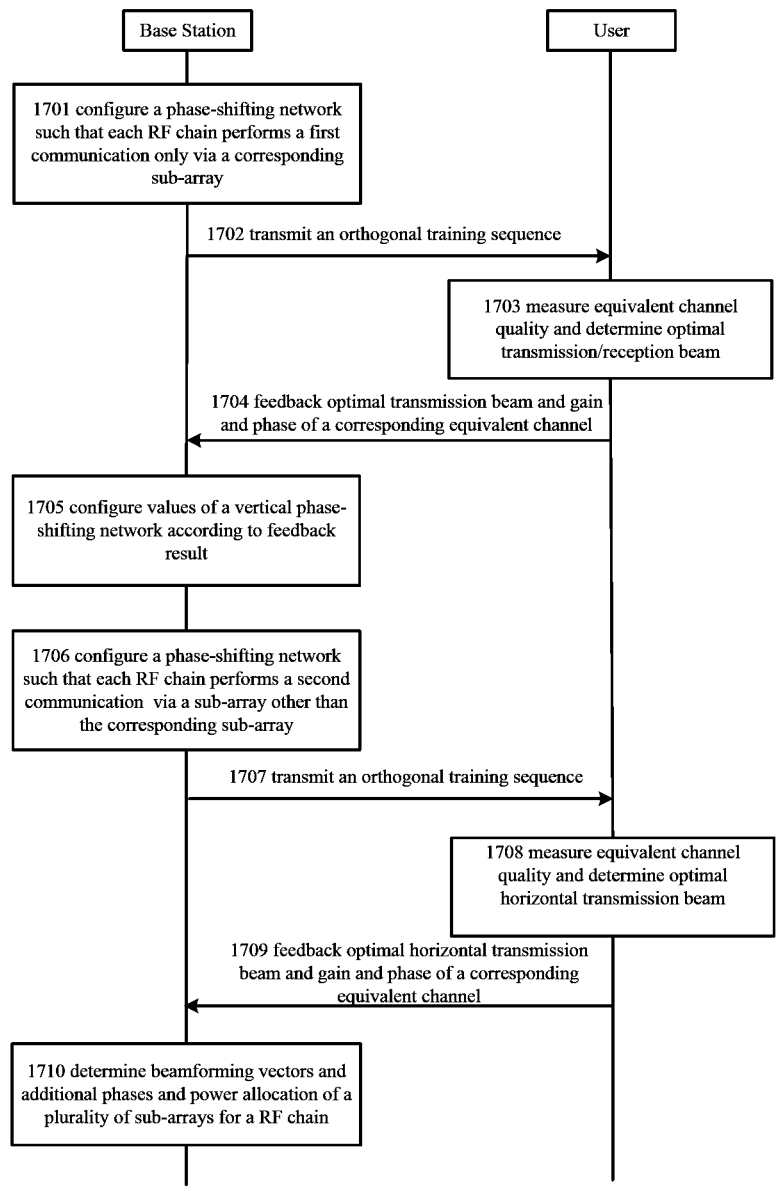
FIG. 17 shows an exemplary implementation for determining a beamforming vector and an additional phase and power allocation factor after combining.

According to an embodiment, the beamforming vector determining step 1602 may be merged with the determination of the additional phase and power allocation factor 1604, and accordingly, step 1603 and step 1605 may also be merged. FIG. 17 shows an exemplary implementation for determining beamforming vectors and additional phases and power allocation factors after merging. FIG. 17 is substantially the same as steps 1611-1620 in FIG. 16 except that in step 1704, the user also needs to feed back the gain and phase of the equivalent channel $h_{k,k}^{eq}$ corresponding to the transmission beam; in step 1709, the user also needs to feed back the gain and phase of the equivalent channel $h_{k,j}^{eq}$ corresponding to the horizontal transmission beam; in step 1710, not only the beamforming vectors of the plurality of sub-arrays of each radio frequency chain are determined, but also the additional phase and power allocation factor of each sub-array are determined.

Figure 18:
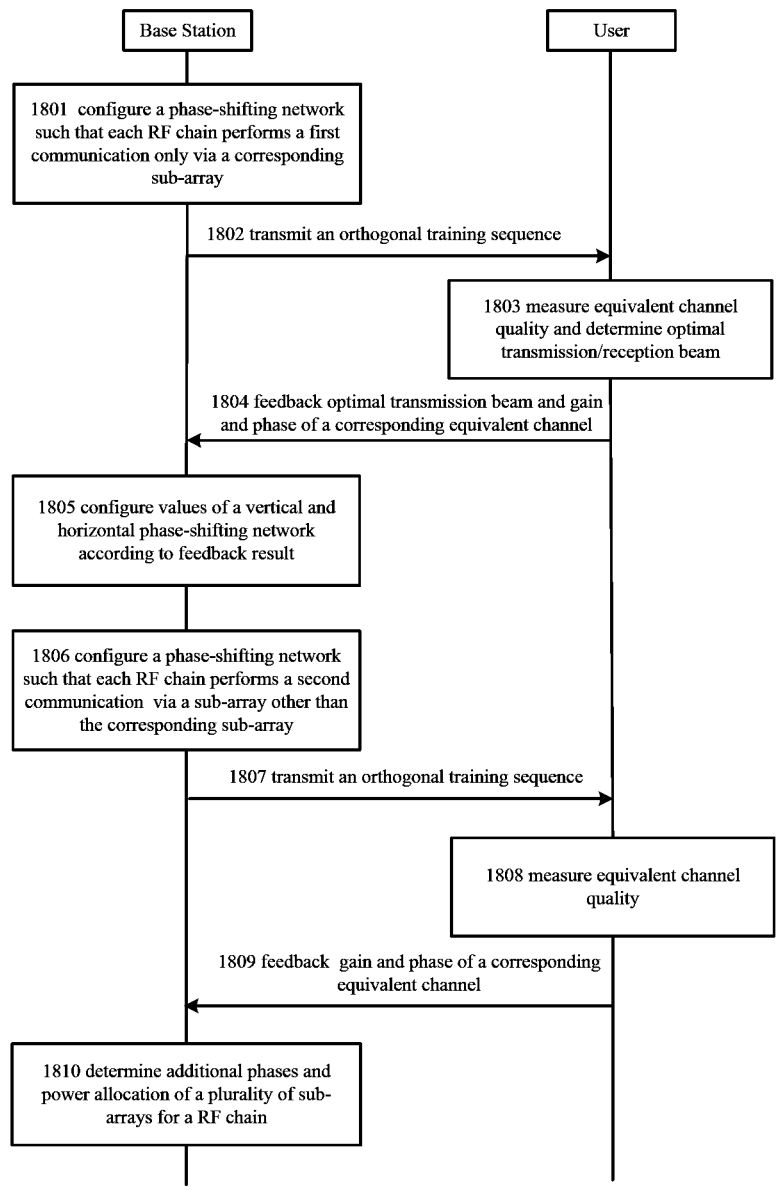
FIG. 18 illustrates an exemplary implementation for determination of a combined beamforming vector and an additional phase and power allocation factor when employing a simplified beamforming training method.

When the aforementioned simplified beamforming training method is employed, the beamforming vector determining step 1602 can also be merged with the determination of the additional phase and power allocation factor 1604. FIG. 18 illustrates an exemplary implementation of determination of the beamforming vector and determination of the additional phase and power allocation factor being merged when the simplified beamforming training method is employed. FIG. 18 is substantially the same as steps 1701-1710 in FIG. 17, except that in step 1805, the base station configures a horizontal phase shifting network and a vertical phase shifting network for all sub-arrays including the other sub-arrays directly according to the optimal transmission beam fedback in step 1804; accordingly, the user no longer needs to determine the optimal horizontal transmission beam in step 1808, nor feed back the optimal horizontal transmission beam in step 1809; in addition, in step 1810, only the additional phase and power allocation factor for each sub-array is determined, because the beamforming vector for each sub-array has been determined in step 1805.

In order to further illustrate the present disclosure, a more specific embodiment is given below.

Figure 19:
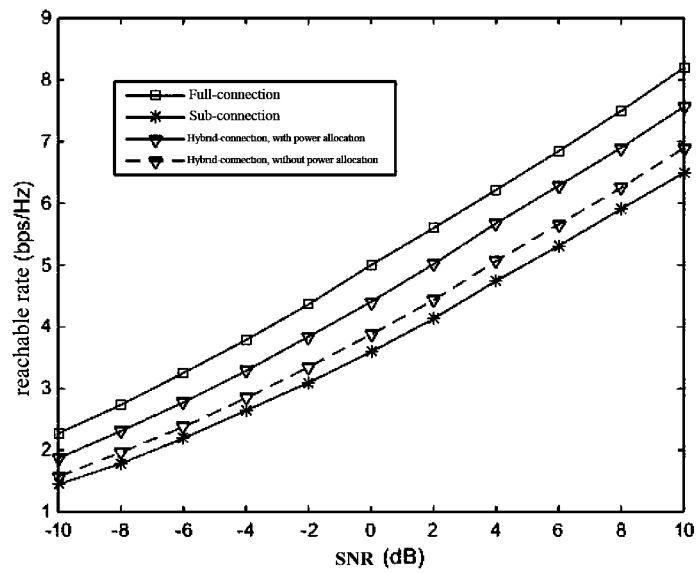
FIG. 19 shows performance simulation results of the hybrid connection architecture.

Considering a millimeter-wave multi-user scenario, the base station is equipped with a UPA array of W=16×H=4, serving K=4 users simultaneously, the base station antennas are divided into K=4 4×4 sub-arrays, and the user terminal is equipped with N=4 ULA arrays. In this configuration, the full connection architecture requires KWH=256 phase shifters, the sub-connection architecture requires WH=64 phase shifters, and the proposed hybrid connection architecture requires WH+KW=128 phase shifters. The simulation results of a user average reachable rate for the three architectures are shown in FIG. 19. It can be seen that the performance of the proposed hybrid connection architecture is between that of the full connection architecture and the sub-connection architecture, and the performance in a case of allowing power allocation is better than that in a case of no power allocation.

APPLICATION EXAMPLE

The technique of the present disclosure can be applied to various products. For example, the BS may be implemented as any type of evolved Node B (eNB), such as a macro eNB and a small eNB. A small eNB may be an eNB that covers cells smaller than the macro cells, such as a pico eNB, a micro eNB, or a home (femto) eNB. Alternatively, the BS may be implemented as any other type of BS, such as a NodeB and a Base Transceiver Station (BTS). The BS may comprise: a main unit that is configured to control wireless communication, also referred to as a BS apparatus, such as the electronic equipments 700 and 710 as described in the present application; and one or more remote wireless headends (RRHs) that are located in different locations from the main unit. In addition, various types of terminals described below may operate as a BS by temporarily or semi-permanently performing the functions of a BS.

For example, the UE may be implemented as a mobile terminal such as a smart phone, a tablet personal computer (PC), a notebook PC, a portable game terminal, a portable/dongle type mobile router, and a digital camera, or an on-board terminal such as a car navigation apparatus. The UE may also be implemented as a terminal performing machine-to-machine (M2M) communication, also referred to as a machine type communication (MTC) terminal. In addition, the UE may be a wireless communication module installed on each of the aforementioned terminals, such as an integrated circuit module including a single wafer, such as the electronic equipments 700 and 710 as described in the present application.

Figure 20:
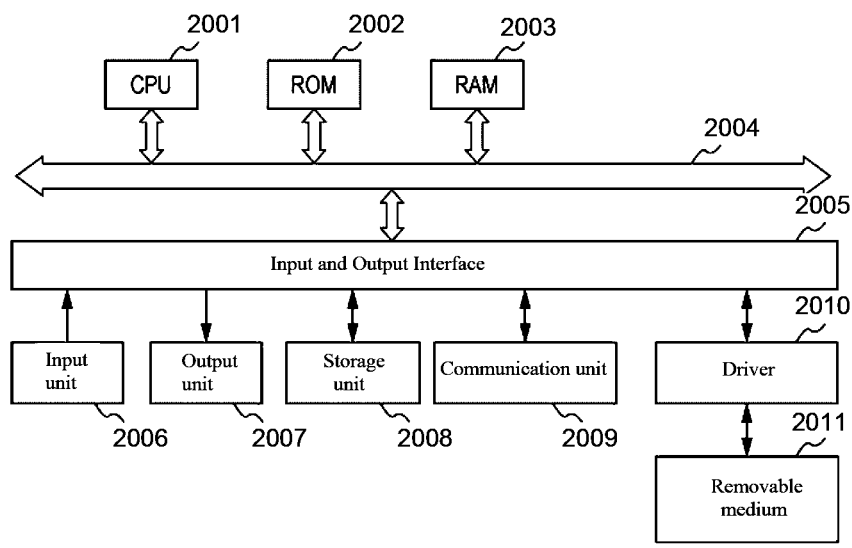
FIG. 20 shows an example of a hardware configuration of an electronic equipment according to the present disclosure.

FIG. 20 shows an example of a hardware configuration of an electronic equipment according to the present invention.

The central processing unit (CPU) 2001 functions as a data processing unit that performs various types of processing based on programs stored on a read only memory (ROM) 2002 or a storage unit 2008. For example, the CPU 2001 performs processing based on the aforementioned sequence. A random access memory (RAM) 2003 stores programs, data, and the like executed by the CPU 2001. The CPU 2001, the ROM 2002, and the RAM 2003 are connected to each other via a bus 2004.

The CPU 2001 is connected to the input and output interface 2005 via a bus 2004, and an input unit 2006 composed of various switches, a keyboard, a mouse, a microphone, and the like, and an output unit 2007 composed of a display, a speaker, and the like are connected to the input and output interface 2005. For example, the CPU 2001 executes various types of processing in response to an instruction input from the input unit 2006, and outputs the processing result to the output unit 2007.

The storage unit 2008 connected to the input and output interface 2005 is constituted by, for example, a hard disk, and stores thereon programs and various types of data executed by the CPU 2001. The communication unit 2009 communicates with an external apparatus via a network such as the Internet or a local area network.

The drive 2010 connected to the input and output interface 2005 drives a removable medium 2011 such as a magnetic disk, an optical disk, a magneto-optical disk, or a semiconductor memory (for example, a memory card), and acquires each of the contents such as content and key information recorded thereon. Class data. For example, by using the acquired content and key data, the CPU 2001 performs processing such as beamforming training for wireless communication based on the reproduction program.

The methods and systems of the present invention may be implemented in a number of ways. For example, the methods and systems of the present invention can be implemented in software, hardware, firmware, or any combination of software, hardware, and firmware. The above-described sequence of steps for the method is for illustrative purposes only, and the steps of the method of the present invention are not limited to the order specifically described above unless otherwise specifically stated. Moreover, in some embodiments, the invention may also be embodied as a program recorded in a recording medium, the program comprising machine readable instructions for implementing the method according to the invention. Thus, the invention also covers a recording medium storing a program for performing the method according to the invention.

Heretofore, the beamforming training method and the electronic equipment for the base station and the user equipment according to the present invention have been described in detail. In order to avoid obscuring the inventive concept, some details known in the art are not described. Those skilled in the art can fully understand how to implement the technical solutions disclosed herein according to the above description.

The methods and systems of the present invention may be implemented in a number of ways. For example, the methods and systems of the present invention can be implemented in software, hardware, firmware, or any combination of software, hardware, and firmware. The above-described sequence of steps for the method is for illustrative purposes only, and the steps of the method of the present invention are not limited to the order specifically described above unless otherwise specifically stated. Moreover, in some embodiments, the invention may also be embodied as a program recorded in a recording medium, the program comprising machine readable instructions for implementing the method according to the invention. Thus, the invention also covers a recording medium storing a program for performing the method according to the invention.

While the invention has been described in detail with reference to the specific embodiments of the present invention, it should be understood that It will be appreciated by those skilled in the art that the above embodiments may be modified without departing from the scope and spirit of the invention. The scope of the invention is defined by the appended claims.

What is claimed is:

1. An electronic equipment for a first communication apparatus of a wireless communication system, comprising:
  a number of antenna sub-arrays, each sub-array being a planar antenna array, each column or row in the sub-array corresponding to one input terminal;
  a plurality of sets of first direction phase shifters, wherein the first direction phase shifters in each set are disposed between input terminals of the corresponding sub-arrays and a radio frequency chain,
  wherein each set of the plurality of sets of first direction phase shifters is configured to adjust a first direction angle of an antenna beam for transmitting a corresponding radio frequency chain signal in a first direction in accordance with a first control signal,
  wherein each sub-array is configured to transmit antenna beams in a second direction with a different second direction angle, the first direction and the second direction being orthogonal to each other, and
  wherein each antenna in the sub-array is connected to a second direction phase shifter, and the second direction phase shifter is configured to adjust the second direction angle of the antenna beam in the second direction according to a second control signal wherein the second direction phase shifter has a lower precision than the first direction phase shifter.

2. The electronic equipment according to claim 1, wherein each set of first direction phase shifters is connected to only one sub-array, each set of first direction phase shifters comprising at least the same number of phase shifters as the input terminals of the corresponding sub-array, or
  wherein each set of first direction phase shifters is connectable to the number of sub-arrays, each set of first direction phase shifters comprising at least the same number of phase shifters as the total input terminals of the number of sub-arrays.

3. The electronic equipment of claim 1, wherein the electronic equipment is implemented as a base station, and further includes a processing circuitry configured to sequentially generate a second control signal and a first control signal for a beam training stage, and configure a second direction phase shifter to sweep multiple second direction angles to transmit second direction training beams, and then configure the first direction phase shifter to sweep multiple first direction angles to transmit first direction training beams.

4. The electronic equipment of claim 3, wherein the processing circuit is further configured to generate a first control signal and a second control signal for a data communication stage based on the beam training feedback from a second communication apparatus corresponding to each radio frequency chain, and respectively configure first direction phase shifters and second direction phase shifters to thereby transmit communication beams at a specific first direction angle and second direction angle.

5. The electronic equipment according to claim 1, wherein each column in a sub-array corresponds to one input terminal, the first direction corresponding to a horizontal direction and the second direction corresponding to a vertical direction.

* * * * *